US012757271B2

(12) United States Patent
Seok et al.

(10) Patent No.: US 12,757,271 B2
(45) Date of Patent: Oct. 6, 2026

(54) ENHANCED MULTI-LINK SINGLE-RADIO AND MULTI-RADIO SUBBAND OPERATIONS IN WIRELESS COMMUNICATIONS

(71) Applicant: MediaTek Inc., Hsinchu City (TW)

(72) Inventors: Yongho Seok, San Jose, CA (US); James Chih-Shi Yee, San Jose, CA (US)

(73) Assignee: MediaTek Inc., Hsinchu City (TW)

( * ) Notice: Subject to any disclaimer, the term of this patent is extended or adjusted under 35 U.S.C. 154(b) by 0 days.

(21) Appl. No.: 18/123,308

(22) Filed: Mar. 19, 2023

(65) Prior Publication Data

US 2023/0319923 A1 Oct. 5, 2023

Related U.S. Application Data

(60) Provisional application No. 63/328,765, filed on Apr. 8, 2022, provisional application No. 63/324,664, filed on Mar. 29, 2022.

(51) Int. Cl.
*H04W 76/15* (2018.01)
*H04W 74/0816* (2024.01)

(52) U.S. Cl.
CPC ....... *H04W 76/15* (2018.02); *H04W 74/0816* (2013.01)

(58) Field of Classification Search
CPC . H04W 76/15; H04W 74/0816; H04W 84/12; H04W 72/04; H04W 88/06
See application file for complete search history.

(56) References Cited

U.S. PATENT DOCUMENTS

| | | | | |
|---|---|---|---|---|
| 2020/0077404 | A1* | 3/2020 | Chu | H04W 72/542 |
| 2021/0084711 | A1* | 3/2021 | Park | H04W 72/0453 |
| 2021/0251008 | A1* | 8/2021 | Fujimori | H04W 74/006 |
| 2021/0289554 | A1* | 9/2021 | Lou | H04W 74/006 |
| 2021/0377928 | A1 | 12/2021 | Seok et al. | |

(Continued)

FOREIGN PATENT DOCUMENTS

| | | | |
|---|---|---|---|
| EP | 2811772 | A1 | 12/2014 |
| KR | 20180079513 | A | 7/2018 |
| WO | WO 2021177774 | A2 | 9/2021 |

OTHER PUBLICATIONS

European Patent Office, Extended European Search Report in European Patent Application No. 23163805.7, Jul. 5, 2023.

*Primary Examiner* — Sudesh M. Patidar
(74) *Attorney, Agent, or Firm* — Andy M. Han; Han IP PLLC

(57) ABSTRACT

A first multi-link device (MLD) enables an enhanced multi-link single-radio (EMLSR) mode or an enhanced multi-link multi-radio (EMLMR) mode. A first station (STA) affiliated with the first MLD receives from a second MLD and in a first operating channel of the first STA an initial control frame indicating an allocated resource unit (RU), which is indicated in a Secondary RU Allocation subfield in the initial control frame. A second STA affiliated with the first MLD switches from a second operating channel of the second STA to an allocated channel in which the allocated RU is located. The second STA then receives information from the second MLD on the allocated RU during a transmission opportunity (TXOP).

15 Claims, 21 Drawing Sheets

(56) References Cited

U.S. PATENT DOCUMENTS

| | | | | |
|---|---|---|---|---|
| 2023/0103810 | A1* | 4/2023 | Kim | H04W 36/08 370/329 |
| 2023/0209391 | A1* | 6/2023 | Kim | H04W 28/0252 370/329 |
| 2023/0379999 | A1* | 11/2023 | Kim | H04B 7/0413 |
| 2024/0137979 | A1* | 4/2024 | Kim | H04L 69/28 |
| 2024/0244692 | A1* | 7/2024 | Takada | H04W 76/15 |
| 2024/0276405 | A1* | 8/2024 | Hirata | H04W 28/0278 |
| 2024/0334482 | A1* | 10/2024 | Kim | H04W 74/0816 |

* cited by examiner

ENHANCED MULTI-LINK SINGLE-RADIO AND MULTI-RADIO SUBBAND OPERATIONS IN WIRELESS COMMUNICATIONS

CROSS REFERENCE TO RELATED PATENT APPLICATION(S)

The present disclosure is part of a non-provisional patent application claiming the priority benefit of U.S. Provisional Patent Application Nos. 63/324,664 and 63/328,765, filed 29 Mar. 2022 and 8 Apr. 2022, respectively, the contents of which being herein incorporated by reference in their entirety.

TECHNICAL FIELD

The present disclosure is generally related to wireless communications and, more particularly, to enhanced multi-link single-radio (EMLSR) and enhanced multi-link multi-radio (EMLMR) subband operations in wireless communications.

BACKGROUND

Unless otherwise indicated herein, approaches described in this section are not prior art to the claims listed below and are not admitted as prior art by inclusion in this section.

In a wireless local area network (WLAN) according to the Institute of Electrical and Electronics Engineers (IEEE) 802.11 specifications, a multi-link device (MLD) can enable and operate in an EMLSR mode or an EMLMR mode. During operation under the EMLSR or EMLMR mode, each station (STA) affiliated with a non-access point (non-AP) MLD can listen on a respective channel or subband on a respective link of multiple EMLSR or EMLMR links for a trigger frame or initial control frame from an access point (AP) MLD for subsequent reception and/or transmission. However, there may be times during which the AP MLD could allocate a resource unit (RU) to a given STA for the subsequent reception and/or transmission while the allocated RU is in a channel or subband that is different from a current operating channel or subband of that STA. At present time, the behavior of the STA or the non-AP MLD in such cases remains to be defined. Therefore, there is a need for a solution of EMLSR and EMLMR subband operations in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to EMLSR and EMLMR subband operations in wireless communications. Under various proposed schemes in accordance with the present disclosure, issues described herein may be addressed.

In one aspect, a method may involve a first MLD enabling an EMLSR or an EMLMR mode. The method may also involve a first STA affiliated with the first MLD receiving from a second MLD and in a first operating channel of the first STA an initial control frame indicating an allocated RU, which may be indicated in a Secondary RU Allocation subfield in the initial control frame. The method may further involve a second STA affiliated with the first MLD switching from a second operating channel of the second STA to an allocated channel in which the allocated RU is located. The method may additionally involve the second STA receiving information from the second MLD on the allocated RU during a transmission opportunity (TXOP).

In another aspect, a method may involve a first MLD enabling an EMLMR mode. The method may also involve a first STA affiliated with the first MLD receiving from a second MLD and in a first operating channel of the first STA a first initial control frame indicating a first allocated RU, which may be located within the first operating channel and indicated by a Secondary RU Allocation subfield in a first User Info field in the first initial control frame. The method may further involve a second STA affiliated with the first MLD receiving from the second MLD and in a second operating channel of the second STA a second initial control frame indicating a second allocated RU, which may be located within the second operating channel and indicated by another Secondary RU Allocation subfield in a second User Info field in the second initial control frame. The method may additionally involve the first STA communicating with the second MLD by receiving a first MU PPDU via the first allocated RU as well as the second STA communicating with the second MLD by receiving a second MU PPDU via the second allocated RU.

In yet another aspect, an apparatus implementable in a first MLD may include a transceiver and a processor coupled to the transceiver. The transceiver may be configured to communicate wirelessly with a second MLD. The processor may be configured to enable an EMLSR mode or an EMLMR mode. Moreover, the processor may be configured to receive, as a first STA, from the second MLD and in a first operating channel of the first STA an initial control frame indicating an allocated RU, which may be indicated in a Secondary RU Allocation subfield in the initial control frame. Additionally, the processor may be configured to switch, as a second STA, from a second operating channel of the second STA to an allocated channel in which the allocated RU is located. Furthermore, the processor may be configured to receive, as the second STA, information from the second MLD on the allocated RU during a TXOP.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to EMLSR and EMLMR subband operations in wireless communications. According to the present disclosure, a number of possible solutions may be implemented separately or jointly. That is, although these possible solutions may be described below separately, two or more of these possible solutions may be implemented in one combination or another.

Figure 1:
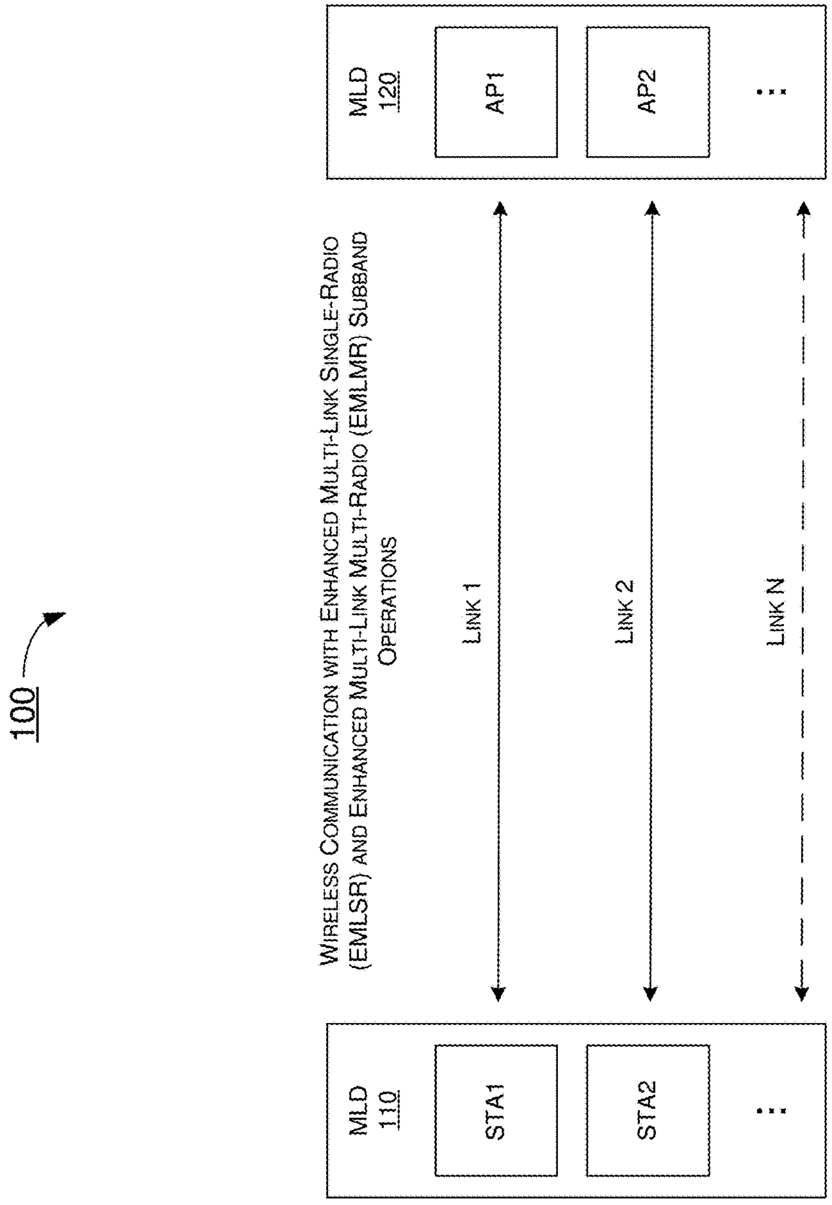
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2-FIG. 21 illustrate examples of implementation of various proposed schemes in network environment 100 in accordance with the present disclosure. The following description of various proposed schemes is provided with reference to FIG. 1-FIG. 21.

Referring to FIG. 1, network environment 100 may involve a first MLD (MLD 110) and a second MLD (MLD 120) communicating wirelessly over N number of multiple links (e.g., at least link 1 and link 2) with N>1, in accordance with one or more IEEE 802.11 standards. Each of MLD 110 and MLD 120 may function as an AP MLD or a non-AP MLD. For instance, MLD 110 may function as a non-AP MLD with multiple virtual STAs operating within MLD 110, and MLD 120 may function as an AP MLD with multiple virtual APs operating within MLD 120. Alternatively, MLD 110 may function as an AP MLD with multiple virtual APs operating within MLD 110, and MLD 120 may function as a non-AP MLD with multiple virtual STAs operating within MLD 120. For illustrative purposes and without limiting the scope of the present disclosure, in FIG. 1, MLD 110 is shown to be affiliated with a number of non-AP STAs (e.g., STA1 and STA2) and MLD 120 is shown to be affiliated with a number of AP STAs (e.g., AP1 and AP2). It is noteworthy that, although a certain number of STAs/APs (e.g., two) is shown to be affiliated with each of MLD 110 and MLD 120, in actual implementations a number N of STAs/APs affiliated with each of MLD 110 and MLD 120 and the number of corresponding links therebetween may be the same or different. Under various proposed schemes in accordance with the present disclosure, MLD 110 and MLD 120 may be configured to perform EMLSR and EMLMR subband operations in wireless communications according to various proposed schemes described herein. It is noteworthy that the various proposed schemes may be implemented individually or, alternatively, jointly (e.g., two or more of the proposed schemes implemented together), even though each of the various proposed schemes may be separately described below. It is also noteworthy that the term "channel" and "subband" are used interchangeably herein and may refer to a narrower bandwidth (e.g., 20 MHz, 40 MHz, 80 MHz or 160 MHz) within a wider operating bandwidth (e.g., 80 MHz, 160 MHz or 320 MHz).

Under current IEEE specification(s), with respect to an EMLSR procedure, a non-AP MLD (e.g., MLD 110) may operate in the EMLSR mode on a specified set of one or more enabled links between the non-AP MLD and its associated AP MLD (e.g., MLD 120). The specified set of the one or more enabled links in which the EMLSR mode is applied may be referred to as EMLSR links. The EMLSR links may be indicated in an EMLSR Link Bitmap subfield of an enhanced multi-link (EML) Control field of an EML Operating Mode Notification frame by setting the bit positions of the EMLSR Link Bitmap subfield to 1. For the EMLSR mode enabled in a single-radio non-AP MLD (e.g., MLD 110), the STA(s) affiliated with the non-AP MLD that operates on the link(s) corresponding to the bit position(s) of the EMLSR Link Bitmap subfield set to 0 may be in a doze state in case that a STA affiliated with the non-AP MLD operating on one of the EMLSR links is in an awake state. Moreover, an MLD with dot11EHTEMLSROptionImplemented equal to 'true' may set an EML Capabilities Present subfield to 1 and may also set an EMLSR Support subfield of a Common Info field of the Basic Multi-Link element to 1 in all Management frames that include the Basic Multi-Link element (except Authentication frames). On the one hand, an MLD with dot11EHTEMLSROptionImplemented equal to 'false' and dot11EHTEMLMROptionImplemented equal to 'true' may set the EML Capabilities Present subfield to 1 and may also set the EMLSR Support subfield of the EML Capabilities subfield to 0. On the other hand, an MLD with dot11EHTEMLSROptionImplemented equal to 'false' and dot11EHTEMLMROptionImplemented equal to 'false' may set the EML Capabilities Present subfield to 0.

With respect to carrying out the EMLSR procedure, when a non-AP MLD (e.g., MLD 110) with dot11EHTEMLSROptionImplemented equal to 'true' intends to operate in the EMLSR mode on the EMLSR links, a STA affiliated with the non-AP MLD may transmit an EML Operating Mode Notification frame, with the EMLSR Mode subfield of an EML Control field of the frame set to 1, to an AP affiliated with an AP MLD (e.g., MLD 120) with dot11EHTEMLSROptionImplemented equal to 'true'. Additionally, an AP affiliated with the AP MLD that received the EML Operating Mode Notification frame from the STA affiliated with the non-AP MLD may transmit an EML Operating Mode Notification frame to one of the STAs affiliated with the non-AP MLD within a timeout interval indicated in the Transition Timeout subfield in the EML Capabilities subfield of the Basic Multi-Link element, starting at the end of a physical-layer protocol data unit (PPDU) transmitted by the AP affiliated with the AP MLD, as an acknowledgement to the EML Operating Mode Notification frame transmitted by the STA affiliated with the non-AP MLD. After a successful transmission of the EML Operating Mode Notification frame on one of the EMLSR links by the STA affiliated with the non-AP MLD, the non-AP MLD may operate in the EMLSR mode and the STAs on the other links of the EMLSR links may transition to an active mode after a transition delay indicated in the Transition Timeout subfield in the EML Capabilities subfield of the Basic Multi-Link element or, alternatively, immediately after receiving an EML Operating Mode Notification frame from one of the APs operating on the EMLSR links and affiliated with the AP MLD. Moreover, a STA on one of the other links of the EMLSR links may not transmit a frame with a Power Management subfield set to 1 before receiving the EML Operating Mode Notification frame from the AP affiliated with the AP MLD or before the end of the timeout interval.

With respect to disabling or existing the EMLSR procedure, when a non-AP MLD (e.g., MLD 110) with dot11EHTEMLSROptionImplemented equal to 'true' intends to disable the EMLSR mode, a STA affiliated with the non-AP MLD may transmit an EML Operating Mode Notification frame, with the EMLSR Mode subfield of the EML Control field of the frame set to 0, to an AP affiliated with an AP MLD (e.g., MLD 120) with dot11EHTEMLSROptionImplemented equal to 'true'. Correspondingly, an AP affiliated with the AP MLD that received the EML Operating Mode Notification frame from the STA affiliated with the non-AP MLD may transmit an EML Operating Mode Notification frame to one of the STAs affiliated with the non-AP MLD within a timeout interval indicated in the Transition Timeout subfield in the EML Capabilities subfield of the Basic Multi-Link element, starting at the end of the PPDU transmitted by the AP affiliated with the AP MLD, as an acknowledgement to the EML Operating Mode Notification frame transmitted by the STA affiliated with the non-AP MLD. After a successful transmission of the EML Operating Mode Notification frame on one of the EMLSR links by the STA affiliated with the non-AP MLD, the non-AP MLD may disable the EMLSR mode and the STAs on the other links of the EMLSR links may transition to a power-save mode after a transition delay indicated in the Transition Timeout subfield in the EML Capabilities subfield of the Basic Multi-Link element or immediately after receiving an EML Operating Mode Notification frame from one of the APs operating on the EMLSR links and affiliated with the AP MLD. Furthermore, a STA on one of the other links of the EMLSR links may not transmit a frame with the Power Management subfield set to 0 before receiving the EML Operating Mode Notification frame from the AP affiliated with the AP MLD or before the end of the timeout interval.

When a non-AP MLD (e.g., MLD 110) is operating in the EMLSR mode with an AP MLD (e.g., MLD 120) supporting the EMLSR mode, certain conditions may apply, as described below. For instance, the non-AP MLD may be able to listen on the EMLSR links, by having its affiliated STA(s) corresponding to those links in an awake state. The listening operation may include clear channel assessment (CCA) and receiving an initial Control frame of frame exchanges that is initiated by the AP MLD. Additionally, the initial Control frame of frame exchanges may be sent in an orthogonal frequency-division multiplexing (OFDM) PPDU or non-high-throughput (non-HT) duplicate PPDU format using a rate of 6 Mbps, 12 Mbps, or 24 Mbps. Also, the initial Control frame may be a multi-user request-to-send (MU-RTS) Trigger frame or a Buffer Status Report Poll (BSRP) Trigger frame, and reception of MU-RTS and BSRP Trigger frames may be mandatory for a non-AP MLD that is in the EMLSR mode. The number of spatial streams for a response to the BSRP Trigger frame may be limited to one. Moreover, the non-AP MLD may indicate a delay time duration in an EMLSR Padding Delay subfield of the EML Capabilities subfield in the Common Info field of the Basic Multi-Link element. Furthermore, an AP affiliated with the AP MLD that initiates frame exchanges with the non-AP MLD on one of the EMLSR links may begin the frame exchanges by transmitting the initial Control frame to the non-AP MLD with the limitations specified above. After receiving the initial Control frame of frame exchanges, a STA affiliated with the non-AP MLD that was listening on the corresponding link may transmit or receive frames on the link on which the initial Control frame was received but may not transmit or receive on the other EMLSR link(s) until the end of the frame exchanges. Subject to its spatial stream capabilities, operation mode, and link switch delay, the STA affiliated with the non-AP MLD may be capable of receiving a PPDU that is sent using more than one spatial stream on the link on which the initial Control frame was received a short inter-frame space (SIFS) after the end of its response frame transmission solicited by the initial Control frame. During the frame exchanges, the other AP(s) affiliated with the AP MLD may not transmit frames to the other STA(s) affiliated with the non-AP MLD on the other EMLSR link(s).

The non-AP MLD may be switched back to the listening operation on the EMLSR links after the time indicated in the EMLSR Transition Delay subfield of the EML Capabilities subfield in the Common Info field of the Basic Multi-Link element in case that any of certain conditions described below is met and this may be defined as the end of the frame exchanges. For instance, a medium access control (MAC) layer of the STA affiliated with the non-AP MLD that received the initial Control frame does not receive a PHY-RXSTART.indication primitive during a timeout interval of aSIFSTime+aSlotTime+aRxPHYStartDelay starting at the end of a PPDU transmitted by the STA of the non-AP MLD as a response to a most recently received frame from the AP affiliated with the AP MLD or, alternatively, starting at the end of the reception of a PPDU containing a frame for the STA from the AP affiliated with the AP MLD that does not require immediate acknowledgement. Additionally, the MAC layer of the STA affiliated with the non-AP MLD that received the initial Control frame receives a PHY-RXSTART.indication primitive during a timeout interval of aSIFSTime+aSlotTime+aRxPHYStartDelay starting at the end of a PPDU transmitted by the STA of the non-AP MLD as a response to the most recently received frame from the AP affiliated with the AP MLD or, alternatively, starting at the end of the reception of the PPDU containing a frame for the STA from the AP affiliated with the AP MLD that does not require immediate acknowledgement and the STA affiliated with the non-AP MLD does not detect, within the PPDU corresponding to the PHY-RXSTART.indication any of the following frames: (a) an individually addressed frame with the RA equal to the MAC address of the STA affiliated with the non-AP MLD, (b) a Trigger frame that has one of the User Info fields addressed to the STA affiliated with the non-AP MLD, (c) a CTS-to-self frame with the RA equal to the MAC address of the AP affiliated with the AP MLD, (d) a Multi-STA Block Acknowledgement (BlockAck) frame that has one of the Per Association Identifier (AID) traffic identifier (TID) Info fields addressed to the STA affiliated with the non-AP MLD, and (e) a Neighbor Discovery Protocol (NDP) Announcement frame that has one of the STA Info fields addressed to the STA affiliated with the non-AP MLD. Lastly, the STA affiliated with the non-AP MLD that received the initial Control frame does not respond to the most recently received frame from the AP affiliated with the AP MLD that requires immediate response after a SIFS.

There may be other conditions that apply when a non-AP MLD (e.g., MLD 110) is operating in the EMLSR mode with an AP MLD (e.g., MLD 120) supporting the EMLSR mode, as described below. For instance, the AP affiliated with the AP MLD may transmit, before a transmission network allocation vector (TXNAV) timer expires, another initial Control frame addressed to the STA affiliated with the non-AP MLD in case that the AP intends to continue the frame exchanges with the STA and did not receive the response frame from this STA for the most recently transmitted frame that requires an immediate response after a SIFS. When a STA of the non-AP MLD initiates a transmission opportunity (TXOP), the non-AP MLD may switch back to the listening operation on the EMLSR links after the time duration indicated in the EMLSR Transition Delay subfield after the end of the TXOP. Moreover, only one STA affiliated with the non-AP MLD that is operating on one of the EMLSR links may initiate frame exchanges with the AP MLD.

Under current IEEE specification(s), with respect to an EMLMR procedure, a non-AP MLD (e.g., MLD 110) may operate in the EMLMR mode on a specified set of enabled links between the non-AP MLD and its associated AP MLD (e.g., MLD 120). The specified set of enabled links in which the EMLMR mode is applied may be referred to as EMLMR links. The EMLMR links may be indicated or otherwise identified in an EMLMR Link Bitmap subfield of the EML Control field of the EML Operating Mode Notification frame by setting the bit position of each EMLMR Link Bitmap subfield to 1. An MLD with dot11EHTEMLMROptionImplemented equal to 'true' may set the EML Capabilities Present subfield to 1 and may also set an EMLMR Support subfield of the Common Info field of transmitted Basic Multi-Link elements to 1; otherwise, the MLD may set the EMLMR Support subfield to 0. Additionally, an MLD with dot11EHTEMLMROptionImplemented equal to 'true' may indicate the number of spatial streams ($N_{SS}$) that a non-AP MLD supports for reception and transmission during EMLMR operation in an EMLMR Supported MCS And NSS Set subfield of the EML Control field of the EML Operating Mode Notification frame. Moreover, a STA affiliated with the non-AP MLD operating on any of EMLMR links may not be a 20 MHz-only non-AP EHT STA. Furthermore, the supported rates, high-throughput modulation and coding scheme (HT-MCS), very-high-throughput modulation and coding scheme (VHT-MCS), and high-efficiency modulation and coding scheme (HE-MCS) for a bandwidth and $N_{SS}$ may be the same as the supported extremely-high-throughput modulation and coding scheme (EHT-MCS) for the corresponding bandwidth and $N_{SS}$ unless the corresponding modulation and coding scheme (MCS) is not defined. In case that the MCS is not defined in the corresponding physical layer (PHY) amendment, the highest MCS support may be implied. Also, in case that a non-AP MLD with dot11EHTEMLMROptionImplemented equal to 'true' intends to switch EMLMR mode after an MLD association, then a non-AP STA affiliated with the non-AP MLD may transmit an EML Operating Mode Notification frame with EMLMR Mode subfield equal to 1 or 0 to enable or disable the EMLMR mode, respectively.

After successful transmission of the EML Operating Mode Notification frame from a non-AP STA affiliated with a non-AP MLD (e.g., MLD 110) to an AP affiliated with an AP MLD (e.g., MLD 120), the non-AP STA and the AP may initialize the transition timeout timer with a Transition Timeout subfield value in the EML Capabilities subfield of the Basic Multi-Link element received from the AP. The transition timeout timer may begin counting down from the end of the PPDU containing an immediate response to the EML Operating Mode Notification frame. The AP may send an EML Operating Mode Notification frame to the non-AP STA with the EML Control field set to the same value as that of the EML Control field in the received EML Operating Mode Notification frame from the non-AP STA before the transition timeout expires. The non-AP MLD may transition to the indicated mode immediately after successfully receiving the EML Operating Mode Notification frame from the AP or immediately after the transition timeout timer expires, whichever comes first. A non-AP MLD with dot11EHTEMLMROptionImplemented equal to 'true' may indicate the minimum padding duration required for the non-AP MLD to perform EMLMR link switch in an EMLMR Delay subfield in the Common Info field of transmitted Basic Multi-Link elements. It is noteworthy that the link switching may happen during the transmission time of the initial response frame. However, the duration of initial response frame may be different depending on the initial frame. It is possible that the non-AP MLD might determine the minimum padding duration such that it can be satisfied even when the shortest initial response frame is used on EMLMR links (e.g., a CTS frame in a non-HT PPDU with the highest rate in the BSSBasicRateSet parameters).

When an AP of an AP MLD (e.g., MLD 120) transmits a PPDU that initiates a frame exchange with a non-AP MLD (e.g., MLD 110) operating in the EMLMR mode, the AP may ensure that a padding duration of the PPDU is longer than or equal to the minimum padding duration value indicated by the EMLMR Delay field of the Basic Multi-Link element received from the non-AP MLD. When the non-AP MLD operates in the EMLMR mode, after initial frame exchange subject to its per-link spatial stream capabilities and operating mode on one of the EMLMR links, the non-AP MLD may be able to support the following until the end of the frame exchange sequence initiated by the initial frame exchange: (i) reception of PPDUs with the number of spatial streams up to the value as indicated in the EMLMR Supported MCS And NSS Set subfield of the EML Control field of the EML Operating Mode Notification frame at a time on the link for which the initial frame exchange was made; and (ii) transmission of PPDUs with the number of spatial streams up to the value as indicated in the EMLMR Supported MCS And NSS Set subfield of the EML Control field of the EML Operating Mode Notification frame at a time on the link for which the initial frame exchange was made. After the end of the frame exchange sequence, each STA of the non-AP MLD in the EMLMR mode may be able to transmit or receive PPDU(s), subject to its per-link spatial stream capabilities and operating mode and subject to any switching delay indicated by the non-AP MLD.

Figure 2:
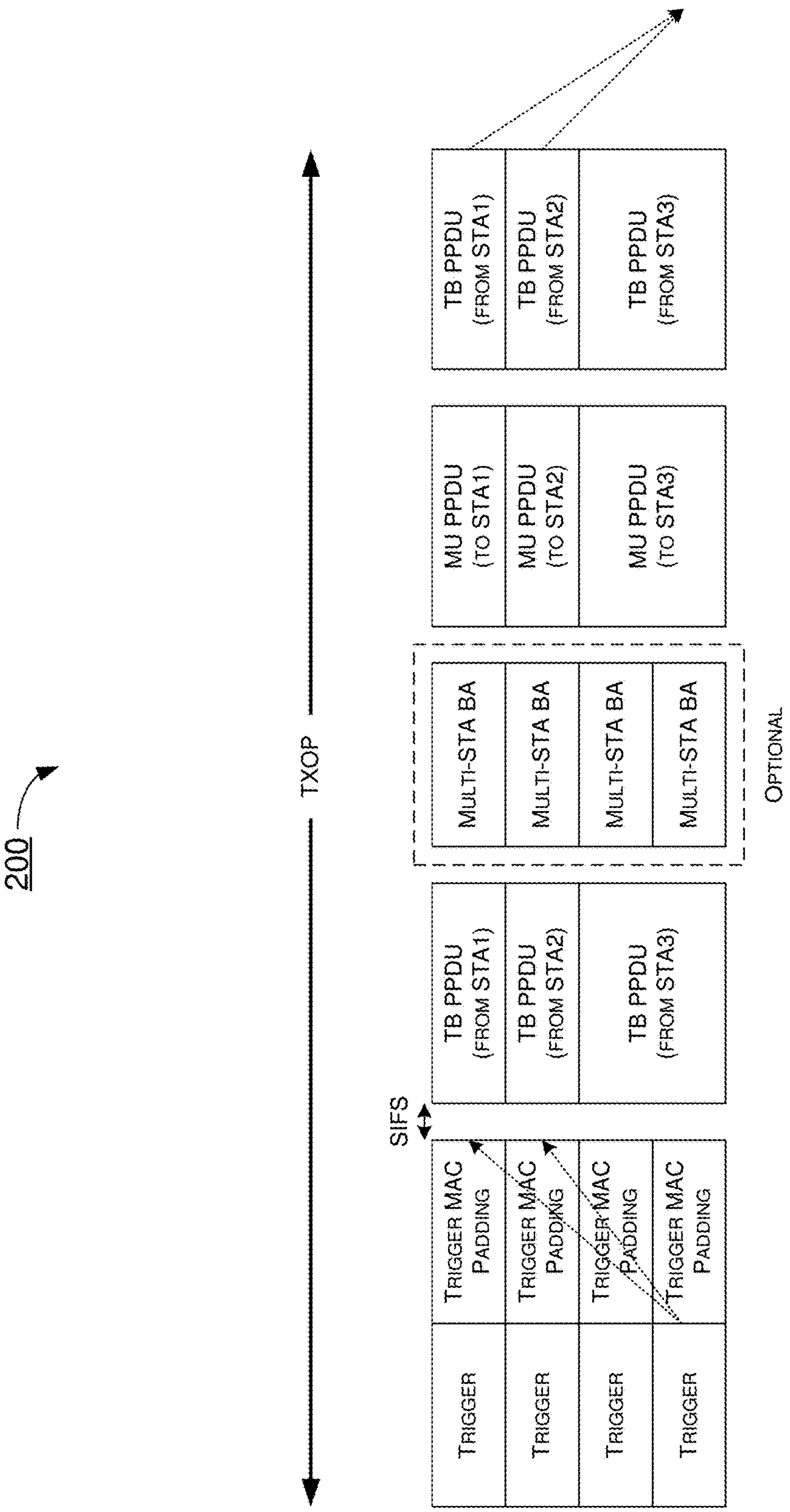
FIG. 2 is a diagram of an example scenario in accordance with an implementation of the present disclosure.

FIG. 2 illustrates an example scenario 200 of a subband operation under a proposed scheme in accordance with the present disclosure. Referring to FIG. 2, under the proposed scheme, an AP affiliated with an AP MLD (e.g., MLD 120) may request a STA affiliated with a non-AP MLD (e.g., MLD 110) to move the STA's operating channel from a current operating channel or subband to a specific secondary channel or subband. On this purpose, the AP may transmit a Trigger frame in which an assigned resource unit (RU) indicated by an RU Allocation field may be within a requested secondary channel or subband for the STA. In an event that the AP receives an high-efficiency (HE) trigger-based (TB) PPDU as a response to the Trigger frame, the switching of the operating channel or subband to the requested secondary channel or subband of the STA may be confirmed. During the TXOP, the AP may assign the RU of the downlink (DL) multi-user (MU) PPDU and TB PPDU addressed to the STA within the STA's switched-to secondary channel or subband. Moreover, under the proposed scheme, the STA may move to a secondary channel or subband after receiving a Trigger frame during a Trigger MAC Padding duration (e.g., 8 μs or 16 μs). Furthermore, the STA that responded to the Trigger frame may stay at the moved-to secondary channel or subband until the end of the TXOP, and the STA may move back to the primary channel or subband after the end of the TXOP. For enhanced reliability, the STA that responded to the Trigger frame may wait for an acknowledgement frame of the TB PPDU. That is, when the STA receives the acknowledgement frame, the STA may stay at the moved-to secondary channel or subband until the end of the TXOP; otherwise, the STA may move back to the primary channel or subband immediately.

Figure 3:
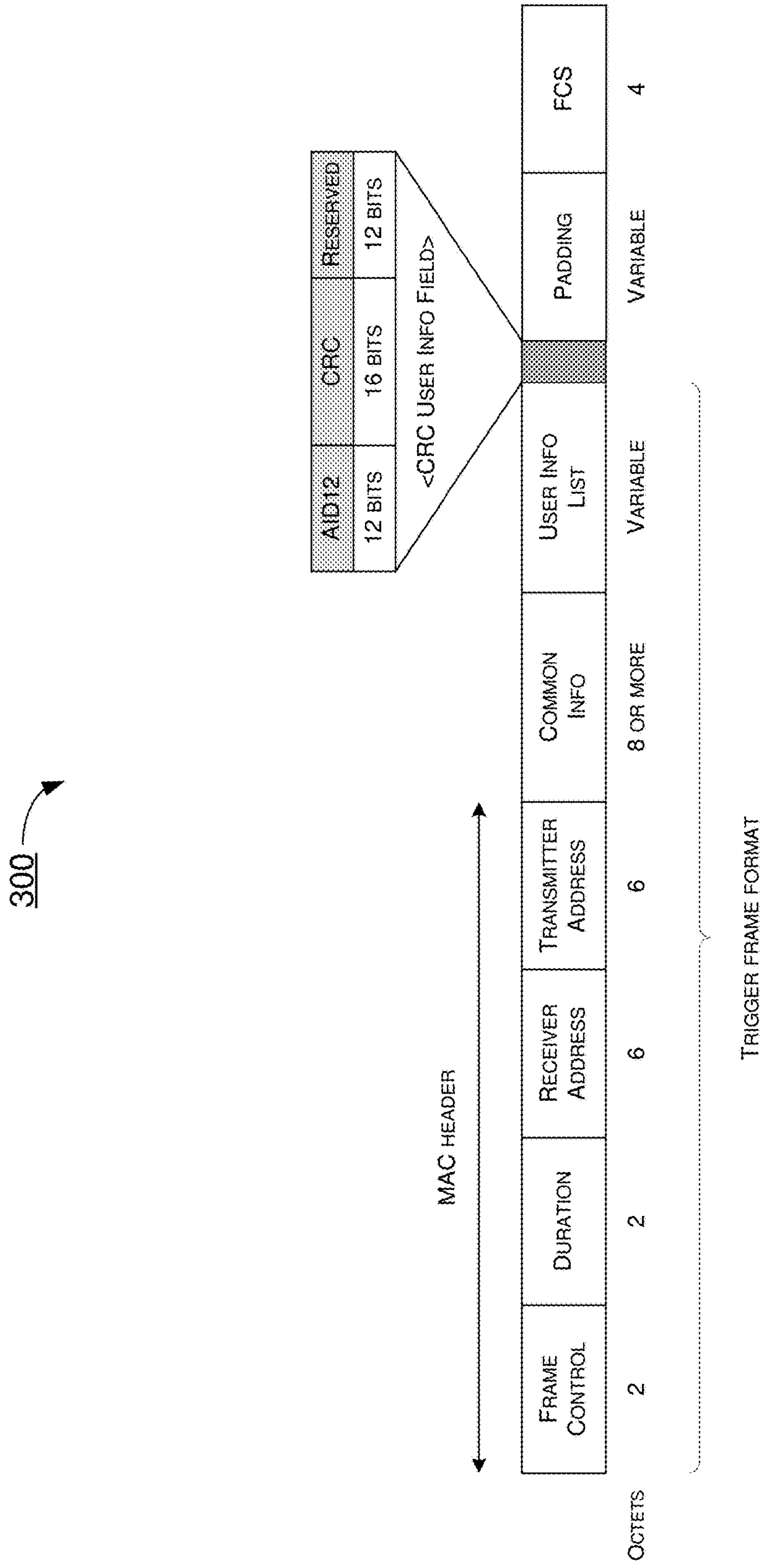
FIG. 3 is a diagram of an example design in accordance with an implementation of the present disclosure.

FIG. 3 illustrates an example design 300 for subband operations under a proposed scheme in accordance with the present disclosure. Referring to FIG. 3, since a frame check sequence (FCS) field is present after a Padding field, there may be a reliability issue with respect to switching during the Padding duration. To address this reliability issue, a cyclic redundancy check (CRC) User Info field may be included and may be placed before the Padding field in the Trigger frame. The CRC User Info field is used to protect the fields (including AID12 subfield of the CRC User Info field) that precede it in the CRC User Info field.

Figure 4:
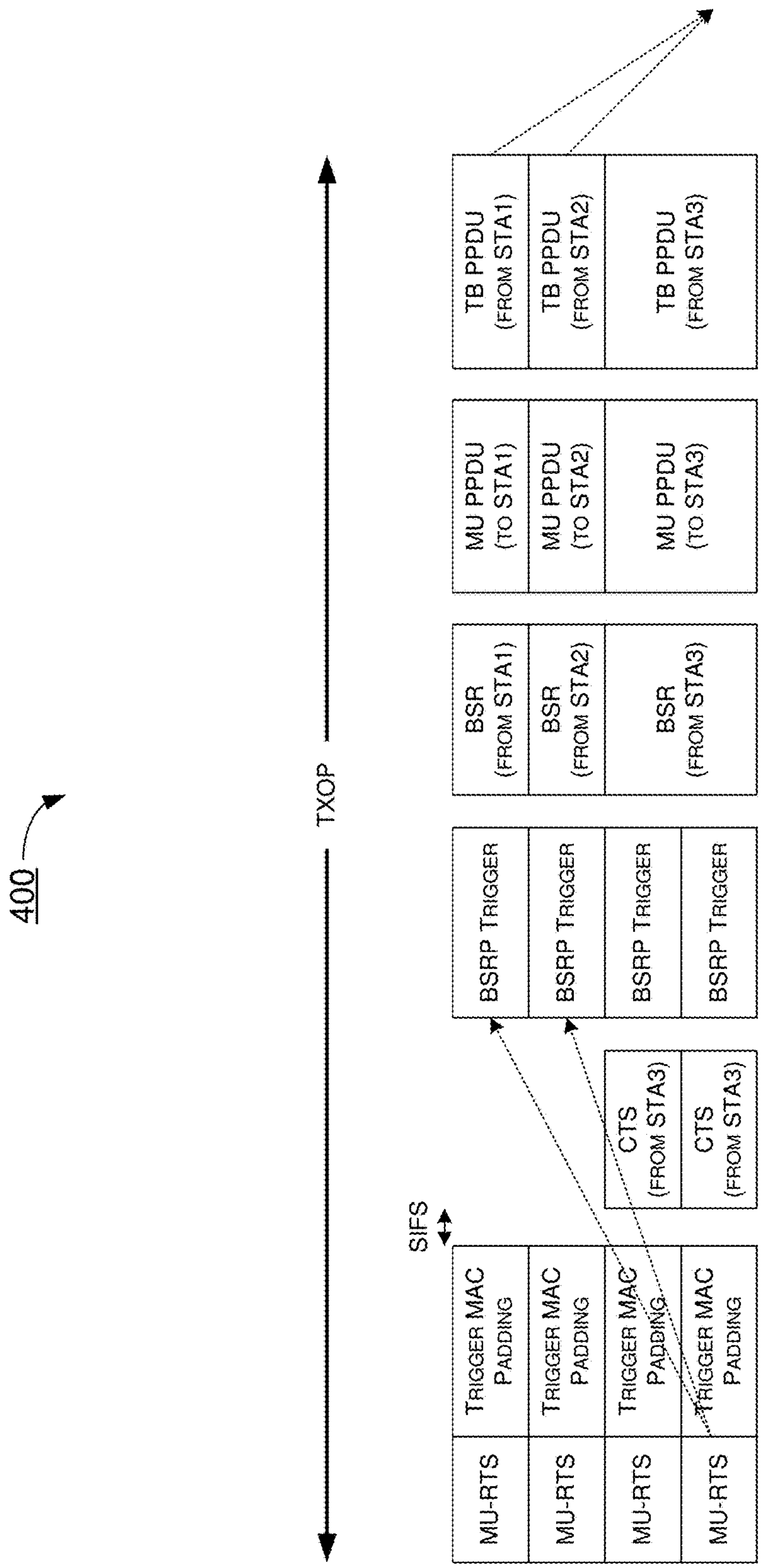
FIG. 4 is a diagram of an example scenario in accordance with an implementation of the present disclosure.

FIG. 4 illustrates an example scenario 400 of a subband operation under a proposed scheme in accordance with the present disclosure. Referring to FIG. 4, under the proposed scheme, multi-user request-to-send (MU-RTS) Trigger frame and clear-to-send (CTS) frame exchange may be used to obtain a TXOP on the primary channel or subband. After receiving the MU-RTS Trigger frame, in case that the RU Allocation subfield in the User Info field addressed to a STA indicates an RU outside of the STA's current operating channel bandwidth, the STA may switch its operating channel or subband to another channel or subband on which the RU is located but the STA may not send a CTS in response. On the other hand, after receiving a CTS response on the primary channel or subband, an AP may send a BSRP Trigger frame to multiple STAs that are listed in the MU-RTS Trigger frame, including the STA that requested to be switched to a secondary channel or subband.

Figure 5:
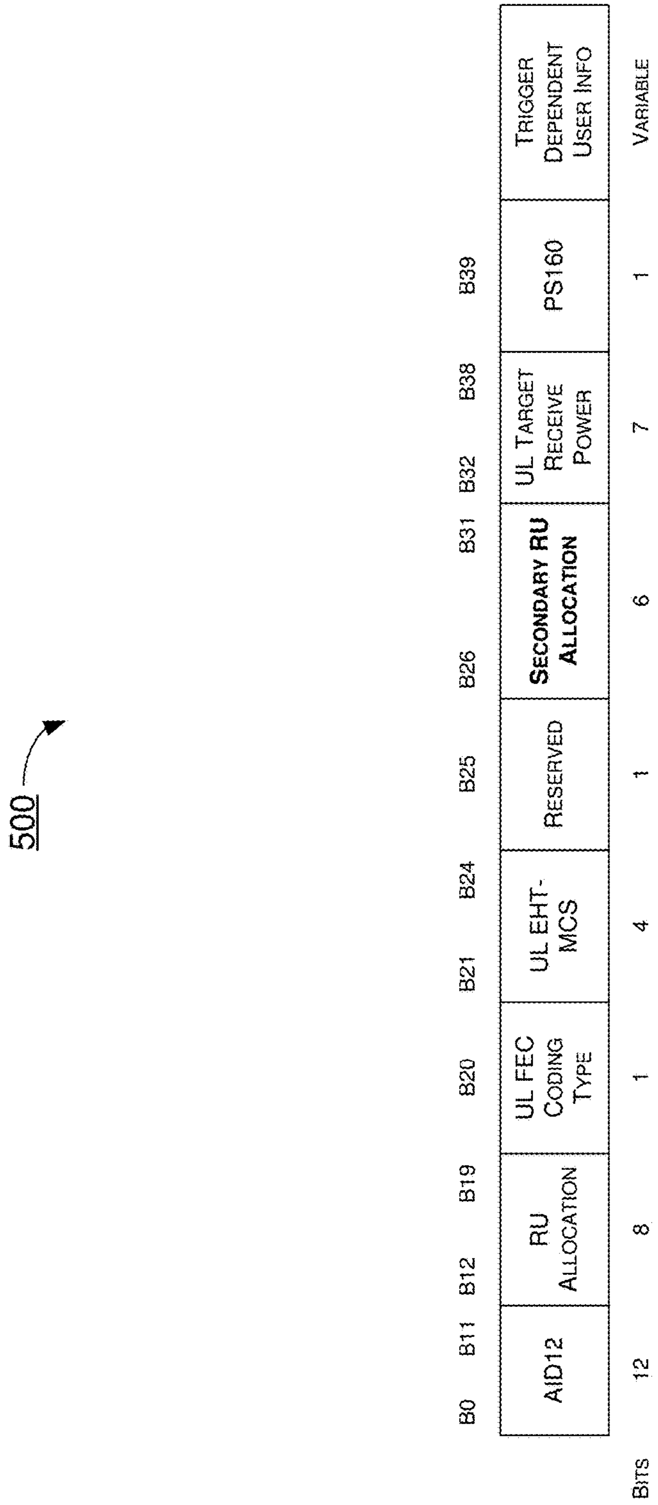
FIG. 5 is a diagram of an example design in accordance with an implementation of the present disclosure.
Figure 6:
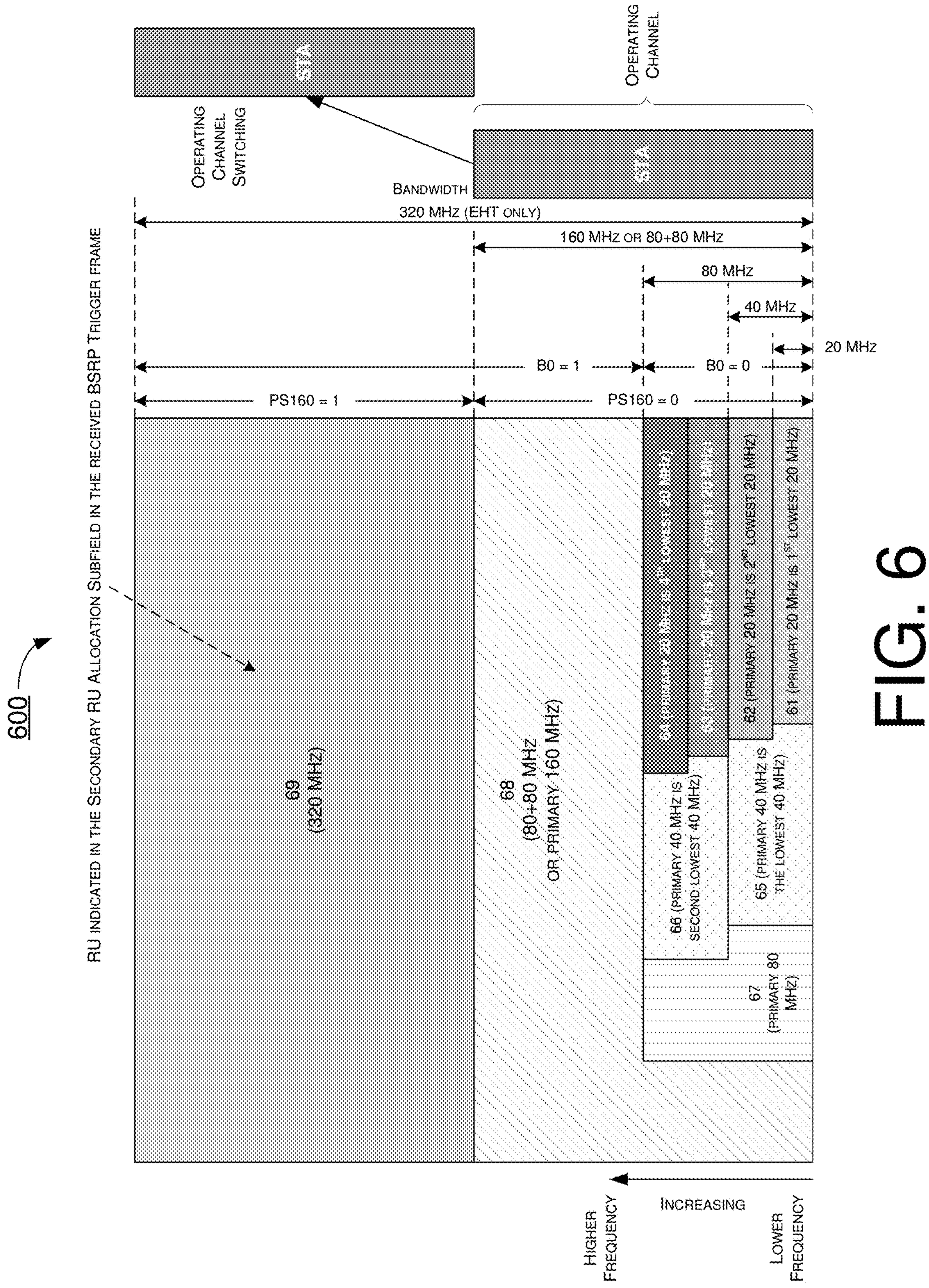
FIG. 6 is a diagram of an example scenario in accordance with an implementation of the present disclosure.
Figure 7:
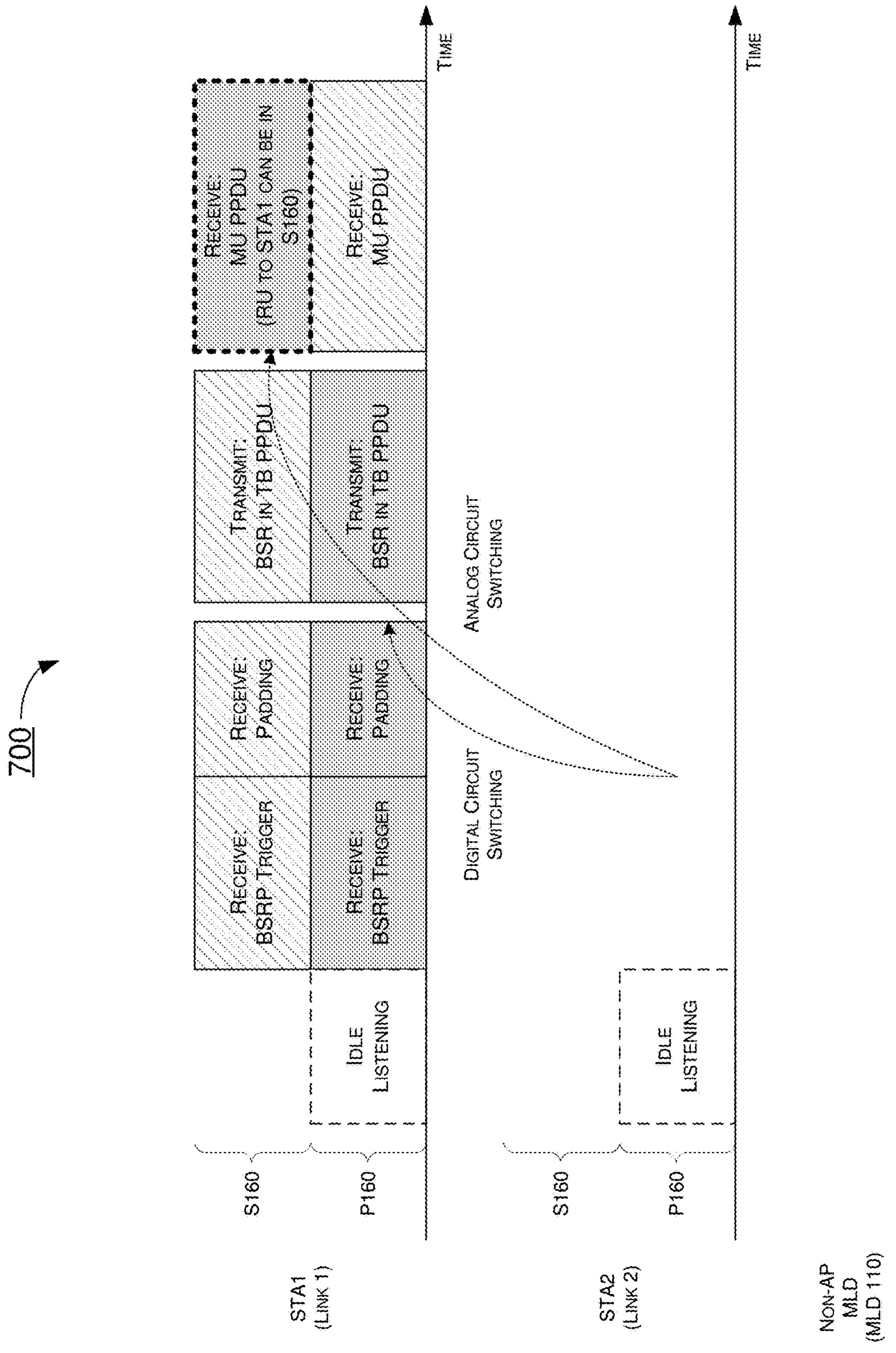
FIG. 7 is a diagram of an example scenario in accordance with an implementation of the present disclosure.

FIG. 5 illustrates an example design 500 for EMLSR subband operations under a proposed scheme in accordance with the present disclosure. In design 500, a User Info field in a BSRP Trigger frame may include a Secondary RU Allocation subfield used for STAs operating in the EMLSR mode. Under the proposed scheme, STAs affiliated with a non-AP MLD (e.g., MLD 110) that enabled the EMLSR mode may operate in the primary 20-MHz, 40-MHz, 80-MHz or 160-MHz channel or subband. After a STA affiliated with the non-AP MLD receives a BSRP Trigger frame as an initial control frame, the STA may respond with a buffer status report (BSR) in the TB PPDU through the RU that is indicated in the RU Allocation subfield. In case that the Secondary RU Allocation subfield in the BSRP Trigger frame indicates an RU outside a current operating bandwidth of the STA, a radio or another STA affiliated with the same non-AP MLD may switch to the channel or subband on which the RU indicated by the Secondary RU Allocation subfield is located. FIG. 6 illustrates an example scenario 600 under the proposed scheme. Referring to FIG. 6, an RU may be indicated in the Secondary RU Allocation subfield in a BSRP Trigger frame so that a STA receiving the BSRP Trigger frame may switch from its current operating channel or subband to another channel or subband corresponding to the RU indicated in the Secondary RU Allocation subfield. FIG. 7 illustrates an example scenario 700 under the proposed scheme. Referring to FIG. 7, upon receiving a BSRP Trigger frame and padding from an AP in a primary 160-MHz channel or subband on an EMLSR link, a STA (e.g., STA1 on link 1 as shown in FIG. 7) may respond by transmitting a BSR in a TB PPDU to the AP in the primary 160-MHz channel or subband (denoted as "P160" in FIG. 7 and other figures) and then switch to a secondary 160-MHz channel or subband (denoted as "S160" in FIG. 7 and other figures) on the EMLSR link to receive a MU PPDU from the AP.

Figure 8:
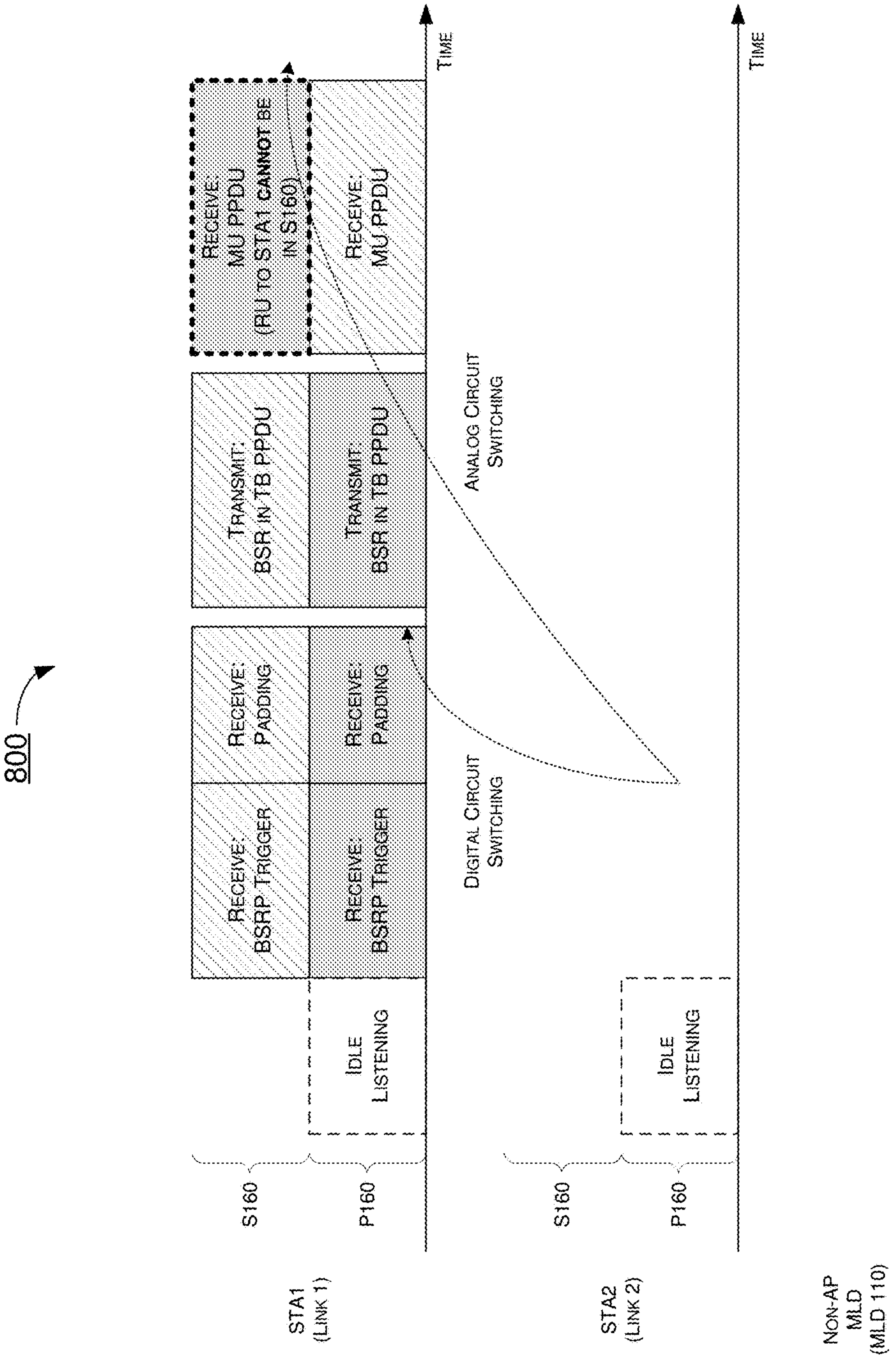
FIG. 8 is a diagram of an example scenario in accordance with an implementation of the present disclosure.

FIG. 8 illustrates an example scenario 800 of EMLSR subband operations under a proposed scheme in accordance with the present disclosure. Under the proposed scheme, a non-AP MLD (e.g., MLD 110) may indicate a radio switching delay time of its subband operation (especially its analog circuit switching delay) in an EMLSR Subband Switch Delay subfield of the EML Capabilities subfield in the Common Info field of the Basic Multi-Link element. The AP MLD (e.g., MLD 120), upon receiving such information and for the non-AP MLD, may allocate an RU to the channel or subband on which the RU indicated by the Secondary RU Allocation subfield is located, after the radio switching delay time of the subband operation is expired after the AP sends the BSRP Trigger frame (excluding the Padding). Referring to FIG. 8, so long as the radio switching delay time of the subband operation of STA1 is not expired, the AP MLD may not allocate an RU to the secondary 160-MHz channel or subband in the MU PPDU addressed to STA1.

Figure 9:
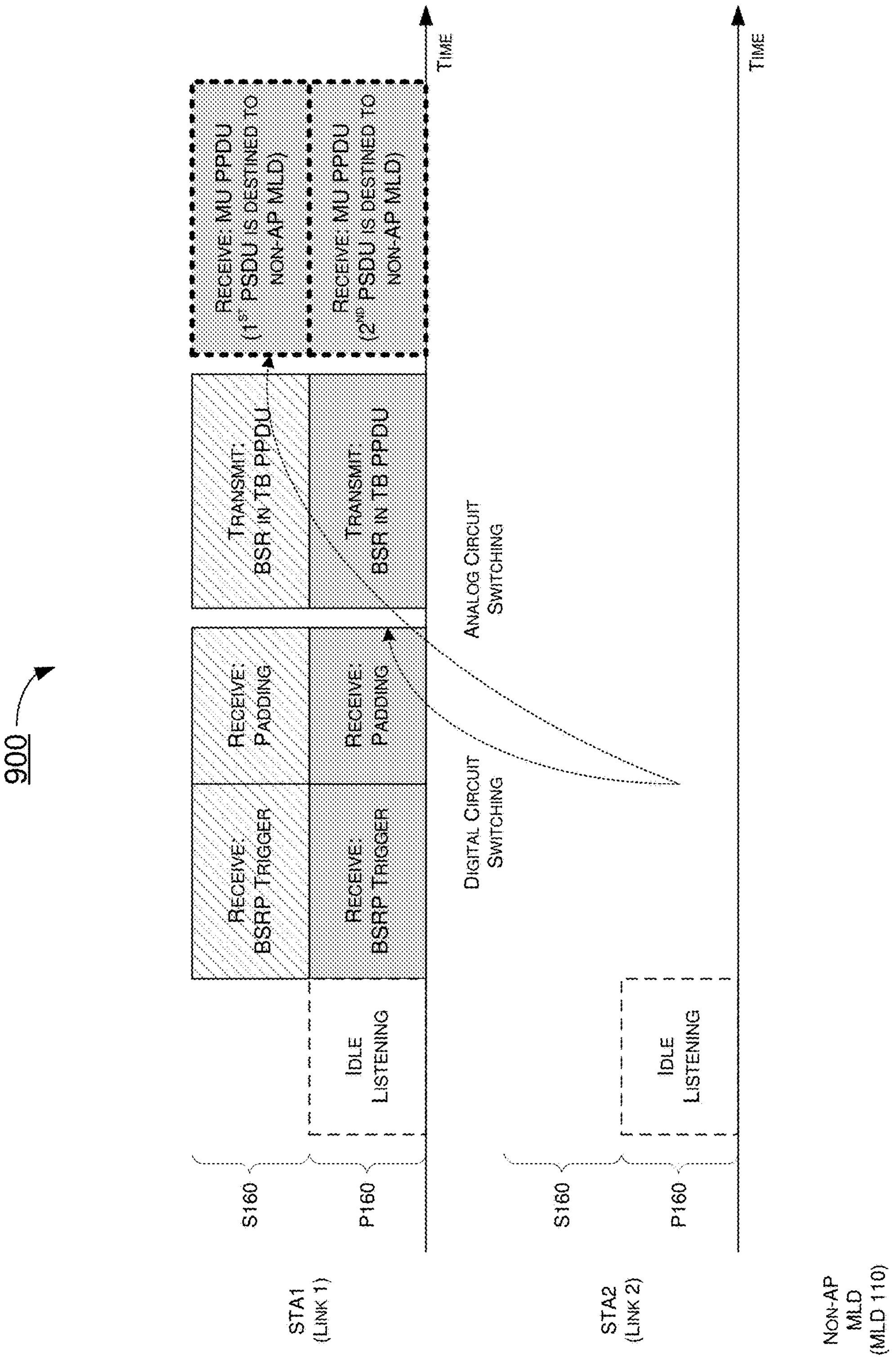
FIG. 9 is a diagram of an example scenario in accordance with an implementation of the present disclosure.

FIG. 9 illustrates an example scenario 900 under a proposed scheme of EMLSR subband operations in accordance with the present disclosure. Under the proposed scheme, in an event that a STA affiliated with a non-AP MLD (e.g., MLD 110) on the EMLSR links are capable of simultaneously receiving and transmitting more than one PPDU, an AP MLD (e.g., MLD 120) may transmit more than one physical-layer Service Data Unit (PSDU) to the non-AP MLD, after a radio of one other STA affiliated with that non-AP MLD has switched to a channel or subband on which an RU indicated by the Secondary RU Allocation subfield is located. This may be equivalent to that one other STA affiliated with the non-AP MLD switching its links. The concept may be similar with EMLMR but one difference is that the non-AP MLD is operating in the EMLSR mode under this proposed scheme. Referring to FIG. 9, in scenario 900, two PSDUs may be destined to the same non-AP MLD (e.g., MLD 110) with each PSDU encoded and decoded independently. Since the full auto functionality of STA2 switches to link 1, this may be equivalent to STA2 temporarily switching to link 2. As a result, STA1 and STA2 may receive a respective PSDU and transmit any responding PPDU independently.

Figure 10:
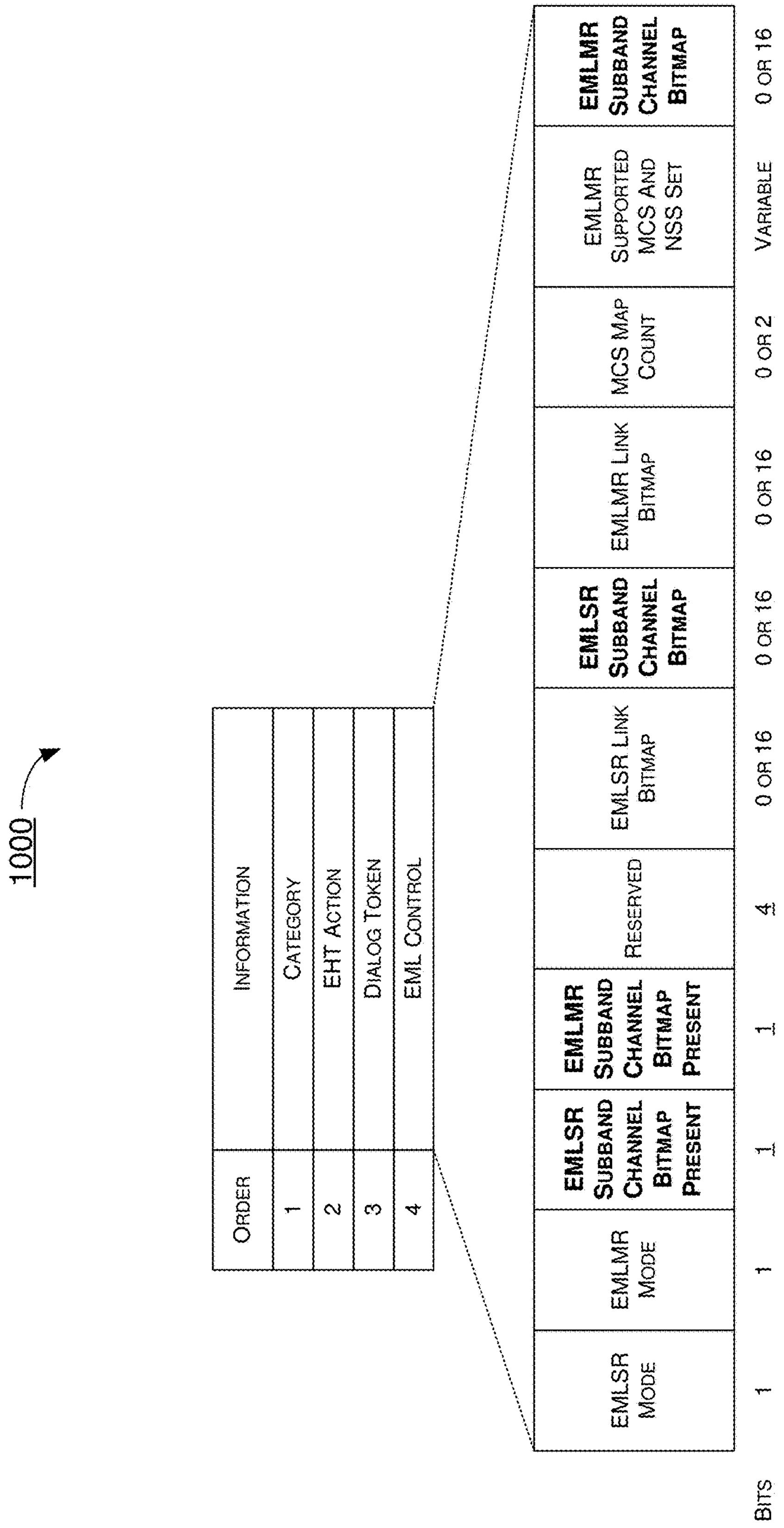
FIG. 10 is a diagram of an example design in accordance with an implementation of the present disclosure.

FIG. 10 illustrates an example design 1000 for EMLSR subband operations under a proposed scheme in accordance with the present disclosure. In design 1000, an EML Operating Mode Notification frame Action field may include an EML Control field which may be utilized to contain information to enable EMLSR and EMLMR subband operations. Referring to FIG. 10, the EML Control field may, among other subfields, include an EMLSR Subband Channel Bitmap Present subfield, an EMLMR Subband Channel Bitmap Present subfield, an EMLSR Subband Channel Bitmap subfield, and an EMLMR Subband Channel Bitmap subfield. Under the proposed scheme, when the EMLSR Subband Channel Bitmap Present subfield is set to 1, the EMLSR Subband Channel Bitmap subfield may indicate one or more 20-MHz channels or subbands on which the EMLSR subband operation may be applied. Otherwise, the EMLSR Subband Channel Bitmap subfield may not be present in the EML Control field. Moreover, when the EMLMR Subband Channel Bitmap Present subfield is set to 1, the EMLMR Subband Channel Bitmap subfield may indicate 20-MHz channels or subbands on which the EMLMR subband operation may be applied. Otherwise, the EMLMR Subband Channel Bitmap subfield may not be present in the EML Control field.

Under a proposed scheme in accordance with the present disclosure with respect to EMLSR subband operations, a non-AP MLD (e.g., MLD 110) may enable an EMLSR Subband mode on one link. A first STA (e.g., STA1) and a second STA (e.g., STA2) affiliated with the non-AP MLD may operate in a first operating channel or subband and a second operating channel or subband, respectively. The first operating channel or subband and the second operating channel or subband may be on the same link (e.g., link 1 or link 2). When both STA1 and STA2 receive a BSRP Trigger frame as an initial control frame and an AID12 subfield indicates an association identifier (AID) associated with the non-AP MLD, certain operations may be performed under the proposed scheme. For instance, in case that the RU Allocation subfield indicates an allocated RU within STA1 or STA2's operating channel or subband, that STA (e.g., STA1 or STA2) may send a BSR in a TB PPDU on the allocated RU. Conversely, in case that the RU Allocation subfield indicates an allocated RU outside STA1 or STA2's operating channel or subband, that STA (e.g., STA1 or STA2) may switch to another operating channel or subband on which the allocated RU is located. It is noteworthy that the AP MLD may include in the BSRP Trigger frame only one User Info field for the non-AP MLD.

As an example to illustrate application of the proposed scheme with respect to EMLSR subband operations, STA1 and STA2 affiliated with the non-AP MLD may operate in a primary 80-MHz channel or subband and a secondary 80-MHz channel or subband, respectively. After STA1 receives a BSRP Trigger frame as an initial control frame, in case that an AID12 subfield indicates an AID associated with the non-AP MLD and the RU Allocation subfield indicates an allocated RU within the primary 80-MHz channel or subband, STA1 may send a BSR in a TB PDU on the allocated RU. On the other hand, in case that the AID12 subfield indicates the AID associated with the non-AP MLD and the RU Allocation subfield indicates an allocated RU within the secondary 80-MHz channel or subband, STA1 may switch to the secondary 80-MHz channel or subband. Similarly, after STA2 receives a BSRP Trigger frame as an initial control frame, in case that the AID12 subfield indicates the AID associated with the non-AP MLD and the RU Allocation subfield indicates an allocated RU within the secondary 80-MHz channel or subband, STA2 may send a BSR in a TB PDU on the allocated RU. Conversely, in case that the AID12 subfield indicates the AID associated with the non-AP MLD and the RU Allocation subfield indicates an allocated RU within the primary 80-MHz channel or subband, STA2 may switch to the primary 80-MHz channel or subband.

As another example to illustrate application of the proposed scheme with respect to EMLSR subband operations, STA1 and STA2 affiliated with the non-AP MLD may operate in a primary 160-MHz channel or subband and a secondary 160-MHz channel or subband, respectively. After STA1 receives a BSRP Trigger frame as an initial control frame, in case that an AID12 subfield indicates an AID associated with the non-AP MLD and the RU Allocation subfield indicates an allocated RU within the primary 160-MHz channel or subband, STA1 may send a BSR in a TB PDU on the allocated RU. On the other hand, in case that the AID12 subfield indicates the AID associated with the non-AP MLD and the RU Allocation subfield indicates an allocated RU within the secondary 160-MHz channel or subband, STA1 may switch to the secondary 160-MHz channel or subband. Similarly, after STA2 receives a BSRP Trigger frame as an initial control frame, in case that the AID12 subfield indicates the AID associated with the non-AP MLD and the RU Allocation subfield indicates an allocated RU within the secondary 160-MHz channel or subband, STA2 may send a BSR in a TB PDU on the allocated RU. Conversely, in case that the AID12 subfield indicates the AID associated with the non-AP MLD and the RU Allocation subfield indicates an allocated RU within the primary 160-MHz channel or subband, STA2 may switch to the primary 160-MHz channel or subband.

Figure 11:
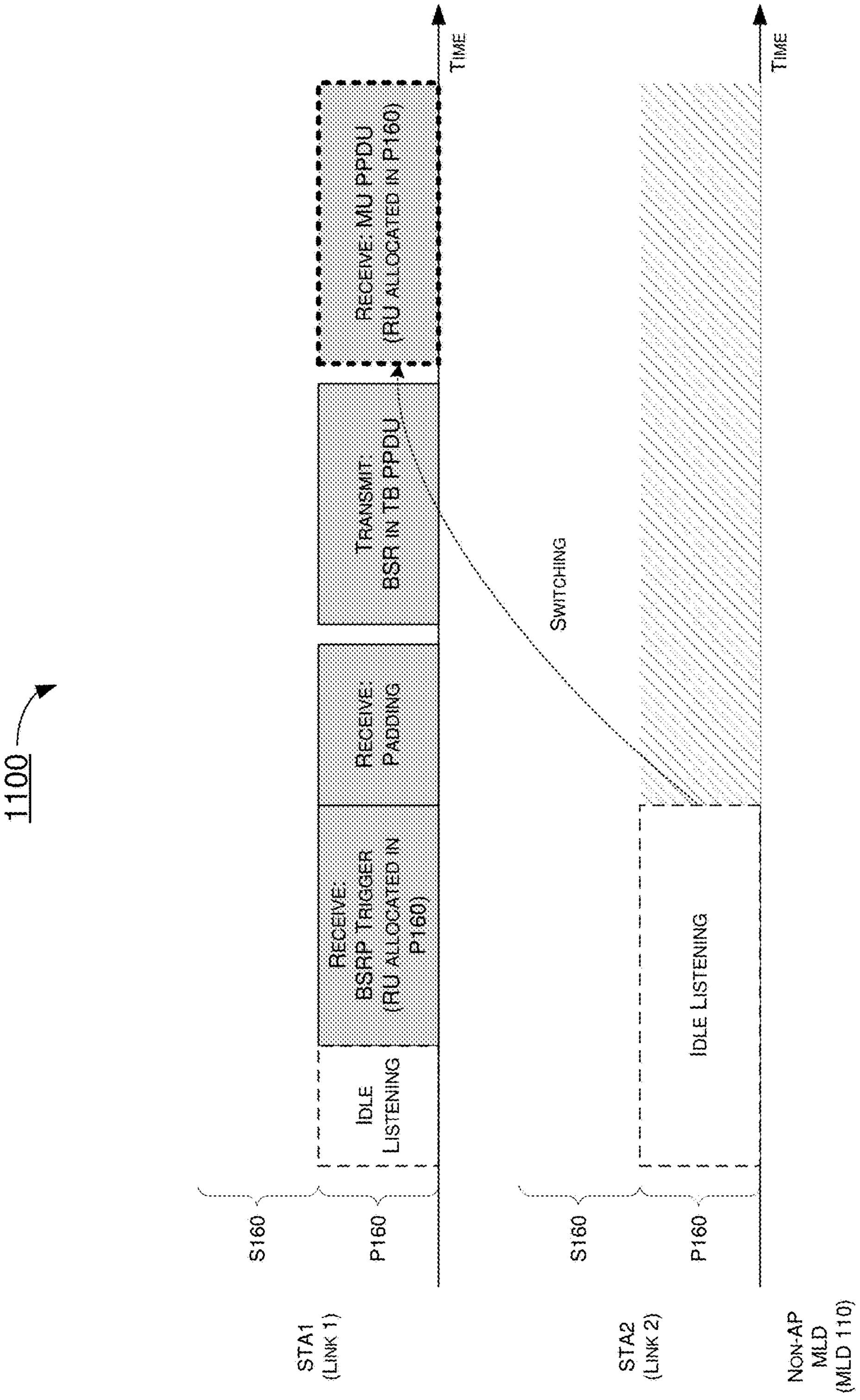
FIG. 11 is a diagram of an example scenario in accordance with an implementation of the present disclosure.

FIG. 11 illustrates an example scenario 1100 under a proposed scheme of an EMLSR subband operation in accordance with the present disclosure. Referring to FIG. 11 with respect to STA1 and STA2 affiliated with a non-AP MLD (e.g., MLD 110), STA1 may be listening in the primary 160-MHz channel or subband on link 1 and STA2 may be listening in the primary 160-MHz channel or subband on link 2. After STA1 receives a BSRP Trigger frame as an initial control frame, with an RU Allocation subfield indicating an allocated RU within the primary 160-MHz channel or subband, STA1 may send a BSR in a TB PDU on the allocated RU. As for STA2, the non-AP MLD may cause STA2 to switch to the primary 160-MHz channel or subband on link 1 to receive a MU PPDU.

Figure 12:
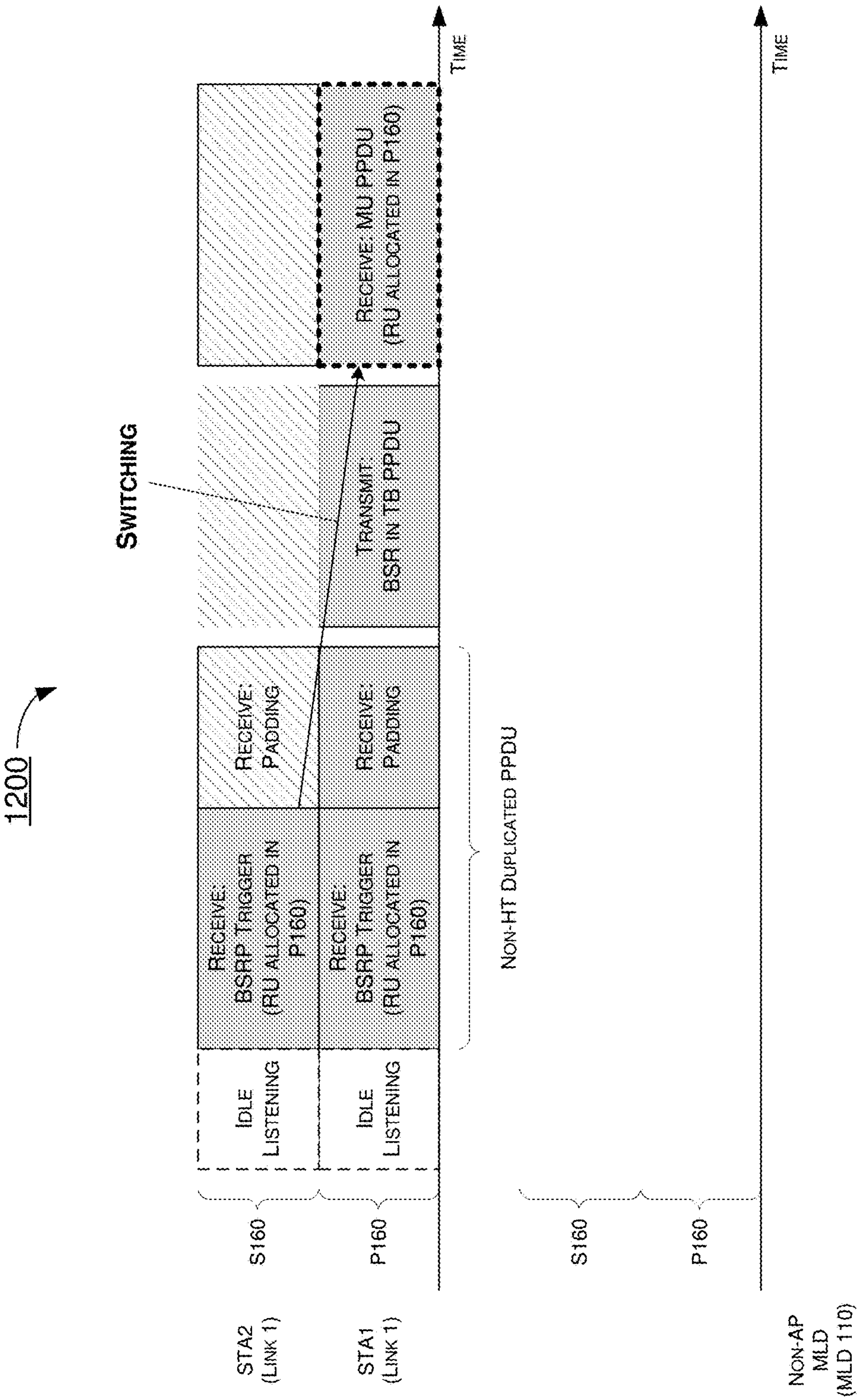
FIG. 12 is a diagram of an example scenario in accordance with an implementation of the present disclosure.

FIG. 12 illustrates another example scenario 1200 under a proposed scheme of an EMLSR subband operation in accordance with the present disclosure. Referring to FIG. 12 with respect to STA1 and STA2 affiliated with a non-AP MLD (e.g., MLD 110), STA1 may be listening in the primary 160-MHz channel or subband on link 1 and STA2 may be listening in the secondary 160-MHz channel or subband on link 1. After STA1 receives a BSRP Trigger frame as an initial control frame, with an RU Allocation subfield indicating an allocated RU within the primary 160-MHz channel or subband, STA1 may send a BSR in a TB PDU on the allocated RU. As for STA2, after receiving a BSRP Trigger frame with an RU Allocation subfield indicating an allocated RU within the primary 160-MHz channel or subband on link 1, STA2 may switch to the primary 160-MHz channel or subband on link 1 to receive a MU PPDU.

Figure 13:
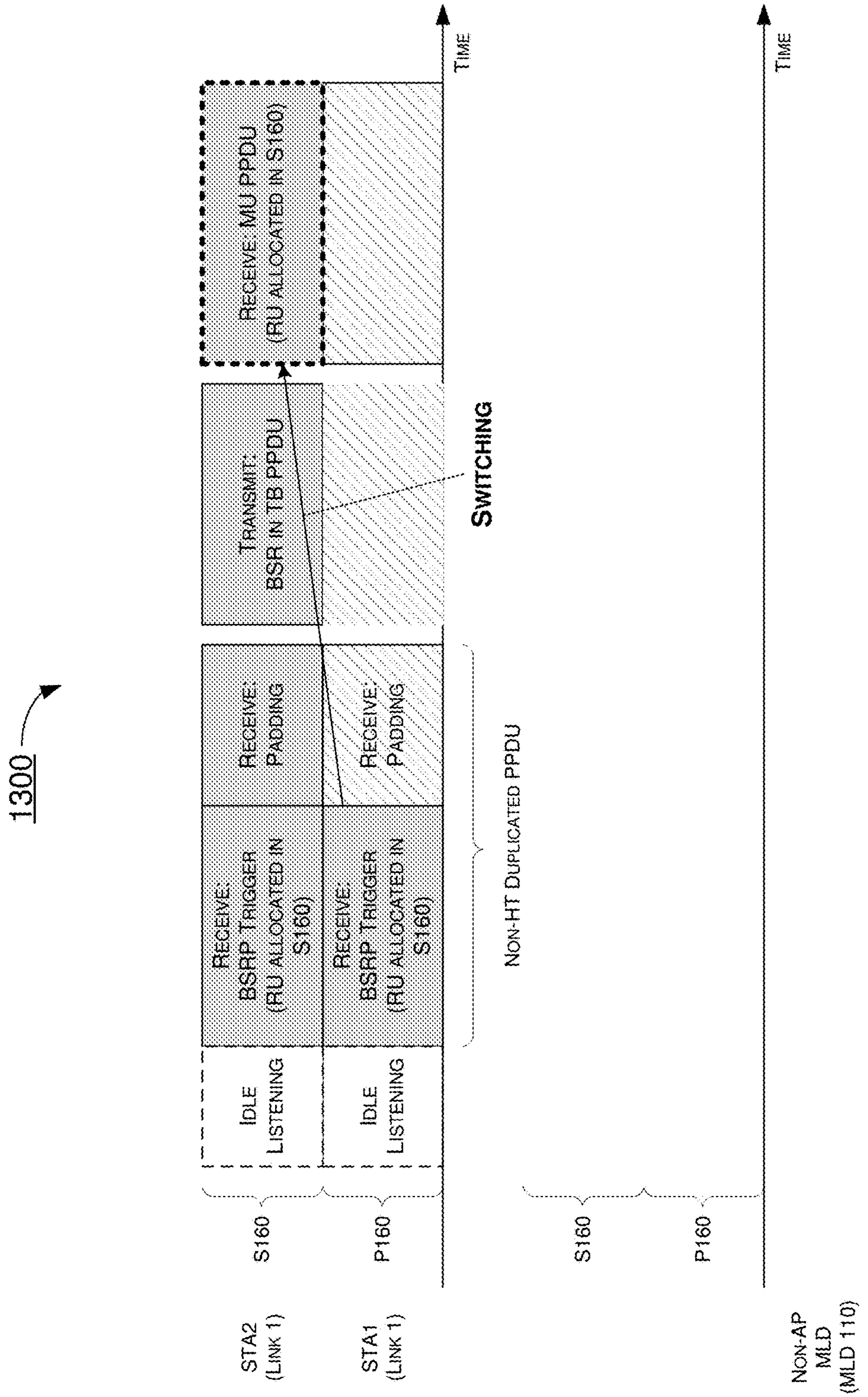
FIG. 13 is a diagram of an example scenario in accordance with an implementation of the present disclosure.

FIG. 13 illustrates yet another example scenario 1300 under a proposed scheme of an EMLSR subband operation in accordance with the present disclosure. Referring to FIG. 13 with respect to STA1 and STA2 affiliated with a non-AP MLD (e.g., MLD 110), STA1 may be listening in the primary 160-MHz channel or subband on link 1 and STA2 may be listening in the secondary 160-MHz channel or subband on link 1. After STA2 receives a BSRP Trigger frame as an initial control frame, with an RU Allocation subfield indicating an allocated RU within the secondary 160-MHz channel or subband, STA2 may send a BSR in a TB PDU on the allocated RU. As for STA1, after receiving a BSRP Trigger frame with an RU Allocation subfield indicating an allocated RU within the secondary 160-MHz channel or subband on link 1, STA1 may switch to the secondary 160-MHz channel or subband on link 1 to receive a MU PPDU.

Figure 14:
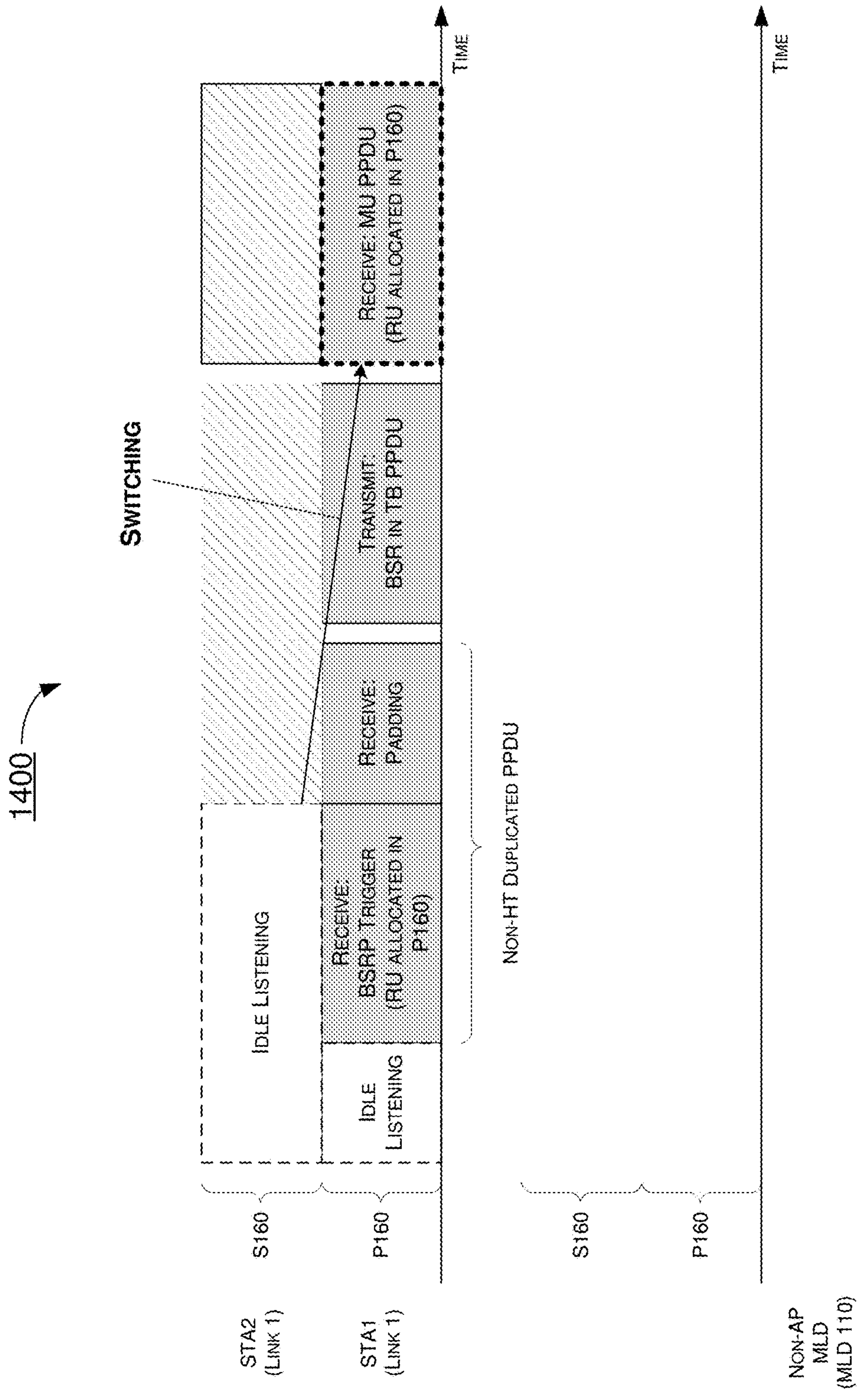
FIG. 14 is a diagram of an example scenario in accordance with an implementation of the present disclosure.

FIG. 14 illustrates still another example scenario 1400 under a proposed scheme of an EMLSR subband operation in accordance with the present disclosure. Referring to FIG. 14 with respect to STA1 and STA2 affiliated with a non-AP MLD (e.g., MLD 110), STA1 may be listening in the primary 160-MHz channel or subband on link 1 and STA2 may be listening in the secondary 160-MHz channel or subband on link 1. After STA1 receives a BSRP Trigger frame as an initial control frame, with an RU Allocation subfield indicating an allocated RU within the primary 160-MHz channel or subband, STA1 may send a BSR in a TB PDU on the allocated RU. As for STA2, the non-AP MLD may cause STA2 to switch to the primary 160-MHz channel or subband on link 1 to receive a MU PPDU.

Under a proposed scheme in accordance with the present disclosure with respect to EMLMR subband operations, a non-AP MLD (e.g., MLD 110) may enable an EMLMR Subband mode on one link. A first STA (e.g., STA1) and a second STA (e.g., STA2) affiliated with the non-AP MLD may operate in a first operating channel or subband and a second operating channel or subband, respectively. The first operating channel or subband and the second operating channel or subband may be on the same link (e.g., link 1 or link 2). When both STA1 and STA2 receive a BSRP Trigger frame as an initial control frame and an AID12 subfield indicates an association identifier (AID) associated with the non-AP MLD, certain operations may be performed under the proposed scheme. For instance, in case that the RU Allocation subfield indicates an allocated RU within STA1 or STA2's operating channel or subband, that STA (e.g., STA1 or STA2) may send a BSR in a TB PPDU on the allocated RU. Conversely, in case that the RU Allocation subfield indicates an allocated RU outside STA1 or STA2's operating channel or subband, that STA (e.g., STA1 or STA2) may switch to another operating channel or subband on which the allocated RU is located. It is noteworthy that the AP MLD may include in the BSRP Trigger frame only one User Info field for the non-AP MLD.

As an example to illustrate application of the proposed scheme with respect to EMLMR subband operations, STA1 and STA2 affiliated with the non-AP MLD may operate in a primary 80-MHz channel or subband and a secondary 80-MHz channel or subband, respectively. After STA1 receives a BSRP Trigger frame as an initial control frame, in case that an AID12 subfield indicates an AID associated with the non-AP MLD and the RU Allocation subfield indicates an allocated RU within the primary 80-MHz channel or subband, STA1 may send a BSR in a TB PDU on the allocated RU. On the other hand, in case that the AID12 subfield indicates the AID associated with the non-AP MLD and the RU Allocation subfield indicates an allocated RU within the secondary 80-MHz channel or subband, STA1 may switch to the secondary 80-MHz channel or subband. Similarly, after STA2 receives a BSRP Trigger frame as an initial control frame, in case that the AID12 subfield indicates the AID associated with the non-AP MLD and the RU Allocation subfield indicates an allocated RU within the secondary 80-MHz channel or subband, STA2 may send a BSR in a TB PDU on the allocated RU. Conversely, in case that the AID12 subfield indicates the AID associated with the non-AP MLD and the RU Allocation subfield indicates an allocated RU within the primary 80-MHz channel or subband, STA2 may switch to the primary 80-MHz channel or subband.

As another example to illustrate application of the proposed scheme with respect to EMLMR subband operations, STA1 and STA2 affiliated with the non-AP MLD may operate in a primary 160-MHz channel or subband and a secondary 160-MHz channel or subband, respectively. After STA1 receives a BSRP Trigger frame as an initial control frame, in case that an AID12 subfield indicates an AID associated with the non-AP MLD and the RU Allocation subfield indicates an allocated RU within the primary 160-MHz channel or subband, STA1 may send a BSR in a TB PDU on the allocated RU. On the other hand, in case that the AID12 subfield indicates the AID associated with the non-AP MLD and the RU Allocation subfield indicates an allocated RU within the secondary 160-MHz channel or subband, STA1 may switch to the secondary 160-MHz channel or subband. Similarly, after STA2 receives a BSRP Trigger frame as an initial control frame, in case that the AID12 subfield indicates the AID associated with the non-AP MLD and the RU Allocation subfield indicates an allocated RU within the secondary 160-MHz channel or subband, STA2 may send a BSR in a TB PDU on the allocated RU. Conversely, in case that the AID12 subfield indicates the AID associated with the non-AP MLD and the RU Allocation subfield indicates an allocated RU within the primary 160-MHz channel or subband, STA2 may switch to the primary 160-MHz channel or subband.

Figure 15:
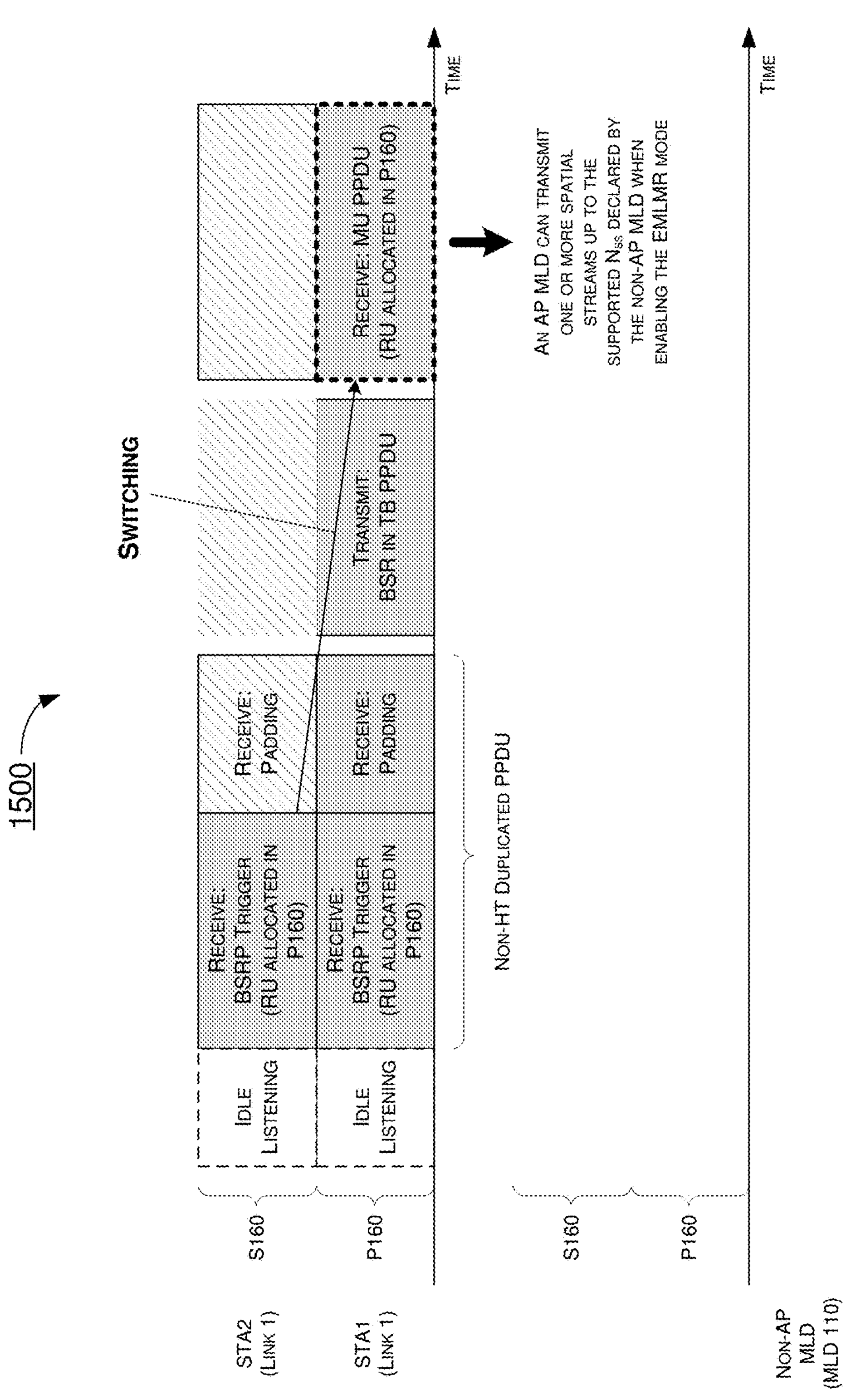
FIG. 15 is a diagram of an example scenario in accordance with an implementation of the present disclosure.

FIG. 15 illustrates another example scenario 1500 under a proposed scheme of an EMLMR subband operation in accordance with the present disclosure. Referring to FIG. 15 with respect to STA1 and STA2 affiliated with a non-AP MLD (e.g., MLD 110), STA1 may be listening in the primary 160-MHz channel or subband on link 1 and STA2 may be listening in the secondary 160-MHz channel or subband on link 1. After STA1 receives a BSRP Trigger frame as an initial control frame, with an RU Allocation subfield indicating an allocated RU within the primary 160-MHz channel or subband, STA1 may send a BSR in a TB PDU on the allocated RU. As for STA2, after receiving a BSRP Trigger frame with an RU Allocation subfield indicating an allocated RU within the primary 160-MHz channel or subband on link 1, STA2 may switch to the primary 160-MHz channel or subband on link 1 to receive a MU PPDU. Here, an AP MLD (e.g., MLD 120) may transmit with one or more spatial streams up to the supported $N_{SS}$ declared by the non-AP MLD when enabling the EMLMR mode or at a time of association between the non-AP MLD and the AP MLD.

Figure 16:
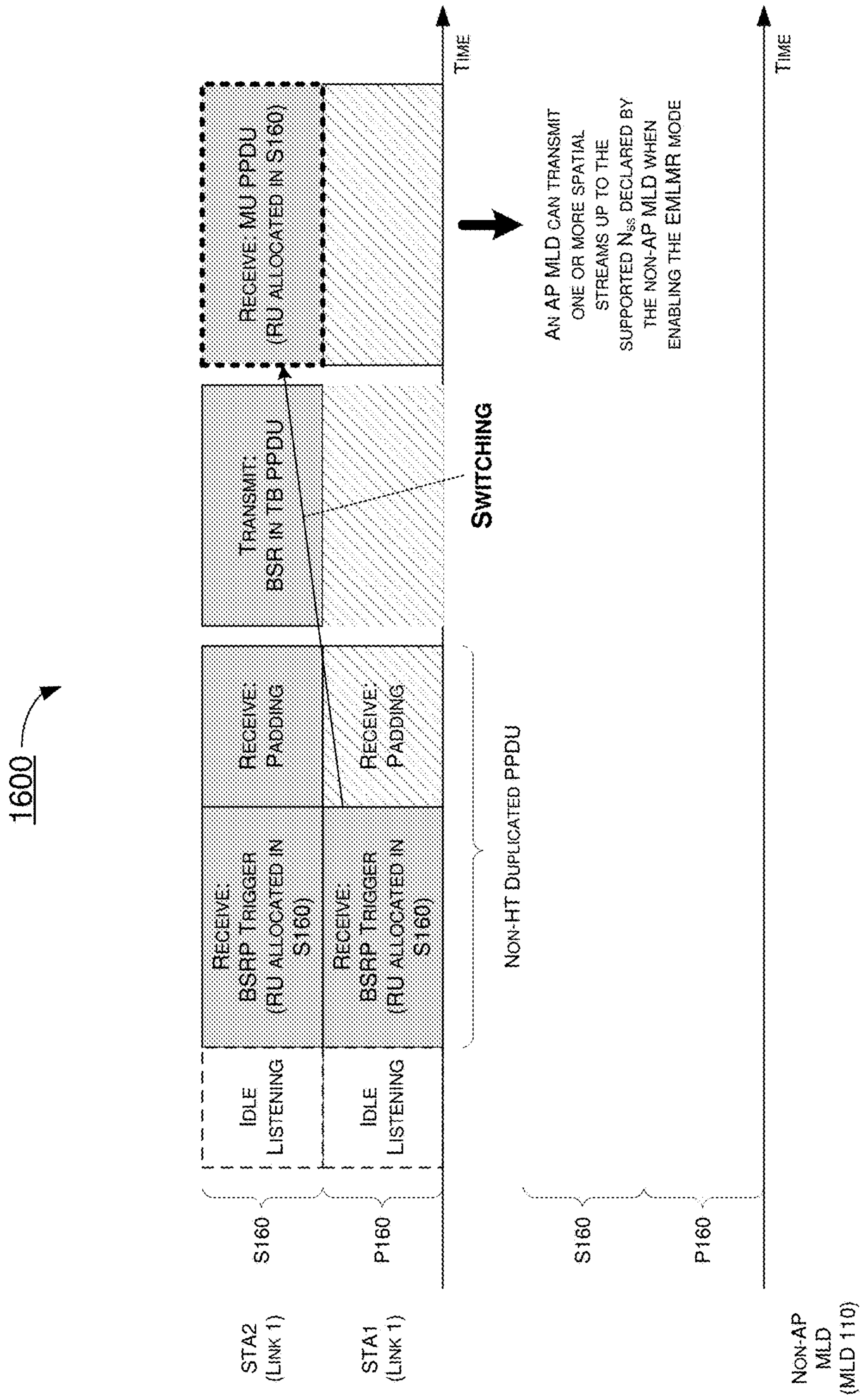
FIG. 16 is a diagram of an example scenario in accordance with an implementation of the present disclosure.

FIG. 16 illustrates yet another example scenario 1600 under a proposed scheme of an EMLMR subband operation in accordance with the present disclosure. Referring to FIG. 16 with respect to STA1 and STA2 affiliated with a non-AP MLD (e.g., MLD 110), STA1 may be listening in the primary 160-MHz channel or subband on link 1 and STA2 may be listening in the secondary 160-MHz channel or subband on link 1. After STA2 receives a BSRP Trigger frame as an initial control frame, with an RU Allocation subfield indicating an allocated RU within the secondary 160-MHz channel or subband, STA2 may send a BSR in a TB PDU on the allocated RU. As for STA1, after receiving a BSRP Trigger frame with an RU Allocation subfield indicating an allocated RU within the secondary 160-MHz channel or subband on link 1, STA1 may switch to the secondary 160-MHz channel or subband on link 1 to receive a MU PPDU. Here, an AP MLD (e.g., MLD 120) may transmit with one or more spatial streams up to the supported $N_{SS}$ declared by the non-AP MLD when enabling the EMLMR mode or at a time of association between the non-AP MLD and the AP MLD.

Figure 17:
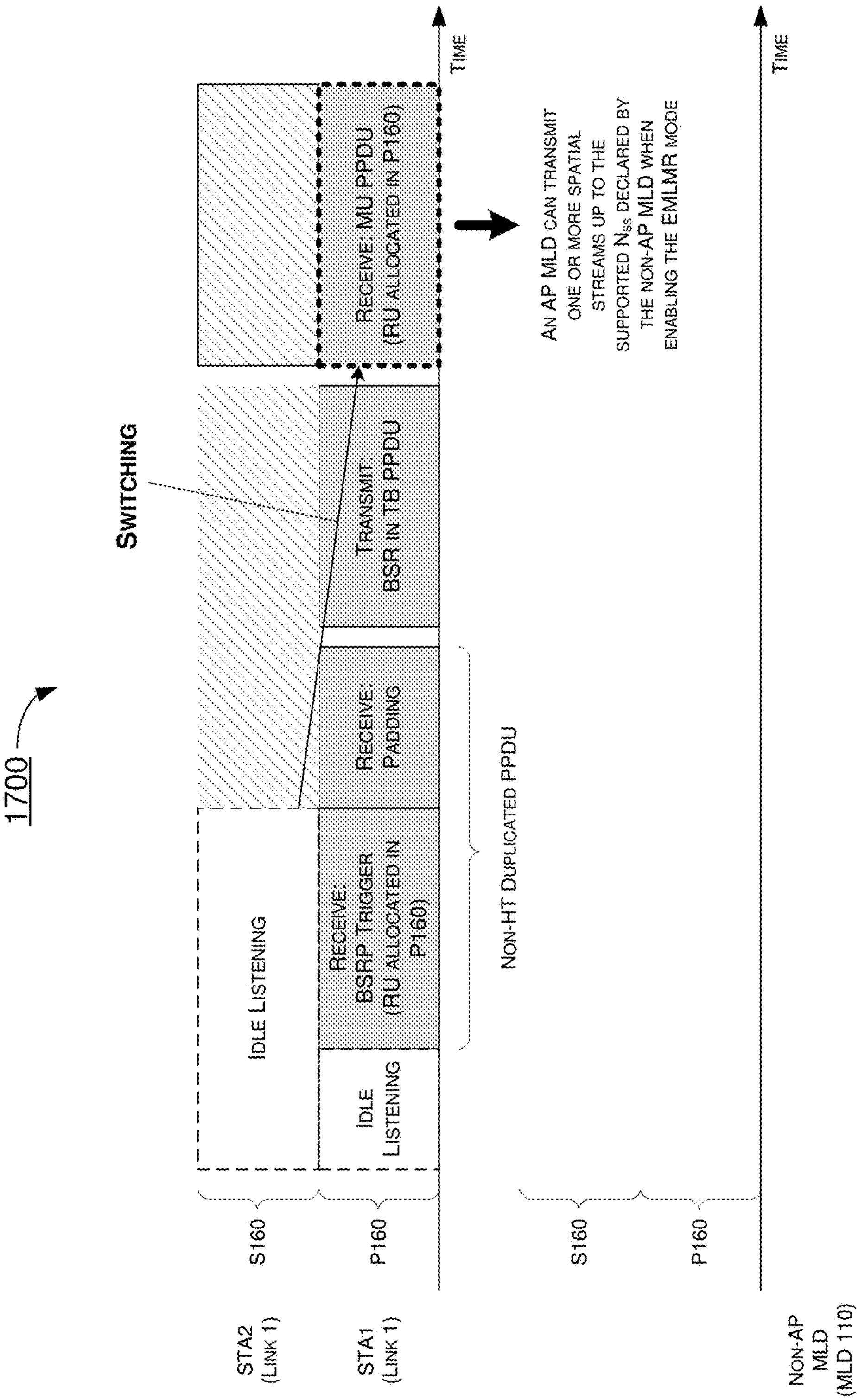
FIG. 17 is a diagram of an example scenario in accordance with an implementation of the present disclosure.

FIG. 17 illustrates still another example scenario 1700 under a proposed scheme of an EMLMR subband operation in accordance with the present disclosure. Referring to FIG. 17 with respect to STA1 and STA2 affiliated with a non-AP MLD (e.g., MLD 110), STA1 may be listening in the primary 160-MHz channel or subband on link 1 and STA2 may be listening in the secondary 160-MHz channel or subband on link 1. After STA1 receives a BSRP Trigger frame as an initial control frame, with an RU Allocation subfield indicating an allocated RU within the primary 160-MHz channel or subband, STA1 may send a BSR in a TB PDU on the allocated RU. As for STA2, the non-AP MLD may cause STA2 to switch to the primary 160-MHz channel or subband on link 1 to receive a MU PPDU. Here, an AP MLD (e.g., MLD 120) may transmit with one or more spatial streams up to the supported $N_{SS}$ declared by the non-AP MLD when enabling the EMLMR mode or at a time of association between the non-AP MLD and the AP MLD.

Under a proposed scheme in accordance with the present disclosure with respect to EMLMR subband operations, an AP MLD (e.g., MLD 120) may include in a BSRP Trigger frame more than one User Info field for the non-AP MLD (e.g., MLD 110). In such cases, after a STA affiliated with the non-AP MLD receives the BSRP Trigger frame as an initial control frame, in case that the AID12 subfield indicates the AID associated with the non-AP MLD and that the RU Allocation subfield indicates an allocated RU within a current operating channel or subband of the STA, the STA may send a BSR in a TB PPDU on the allocated RU and there is no need for the STA to switch its radio. Thus, the AP MLD may transmit more than one PPDUs to the non-AP MLD through a single link (e.g., link 1 or link 2).

Figure 18:
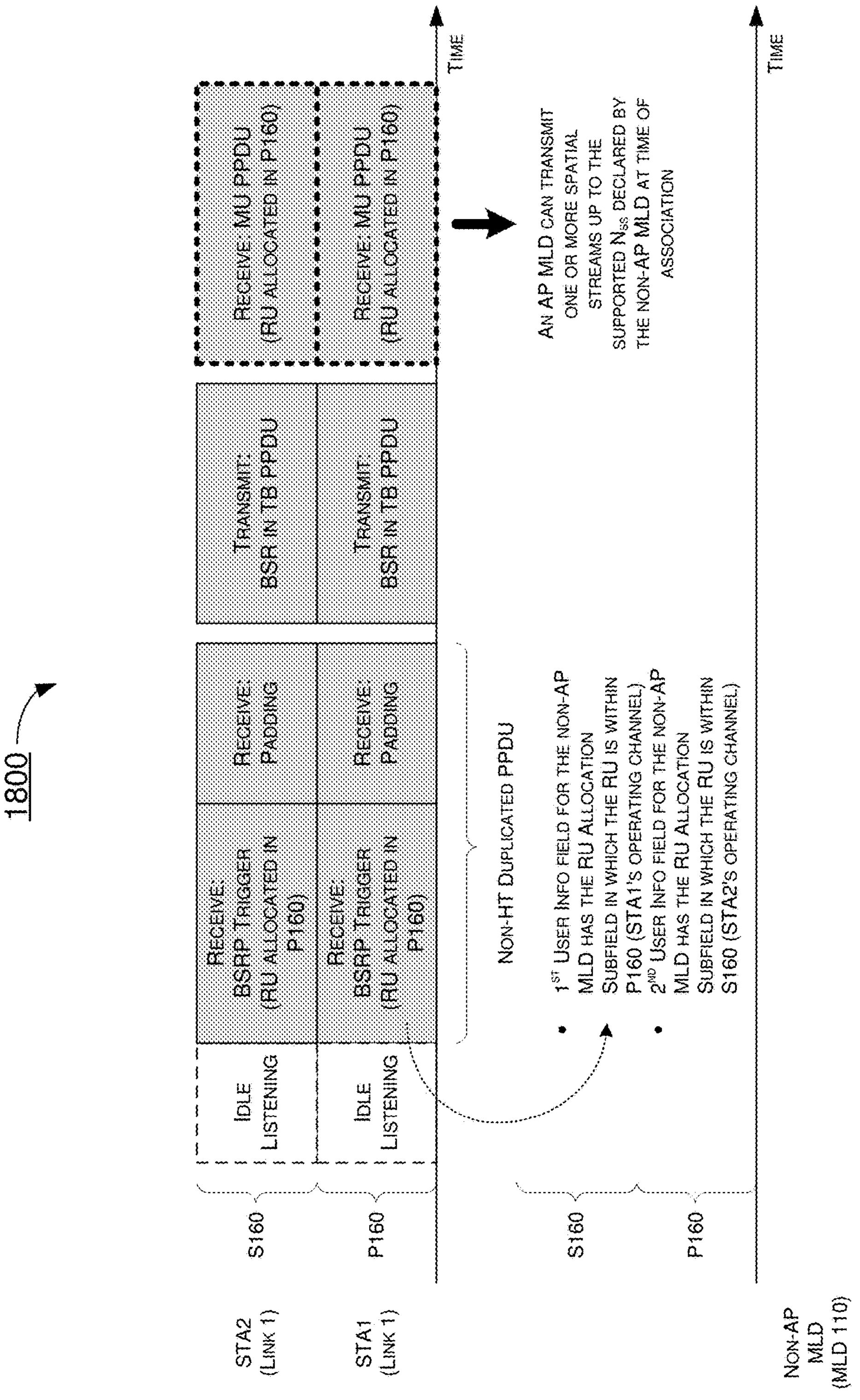
FIG. 18 is a diagram of an example scenario in accordance with an implementation of the present disclosure.

FIG. 18 illustrates an example scenario 1800 under the proposed scheme. Referring to FIG. 18 with respect to STA1 and STA2 affiliated with a non-AP MLD (e.g., MLD 110), STA1 may be listening in the primary 160-MHz channel or subband on link 1 and STA2 may be listening in the secondary 160-MHz channel or subband on link 1. After STA1 receives a BSRP Trigger frame as an initial control frame, with an RU Allocation subfield indicating an allocated RU within the primary 160-MHz channel or subband, STA1 may send a BSR in a TB PDU on the allocated RU in the primary 160-MHz channel or subband on link 1. Similarly, after STA2 receives a BSRP Trigger frame as an initial control frame, with an RU Allocation subfield indicating an allocated RU within the secondary 160-MHz channel or subband, STA2 may send a BSR in a TB PDU on the allocated RU in the secondary 160-MHz channel or subband on link 1. For instance, a first User Info field for the non-AP MLD may have the RU Allocation subfield in which the allocated RU for STA1 is within the primary 160-MHz channel or subband, which is STA1's operating channel or subband. Moreover, a second User Info field for the non-AP MLD may have the RU Allocation subfield in which the allocated RU for STA2 is within the secondary 160-MHz channel or subband, which is STA2's operating channel or subband. Here, an AP MLD (e.g., MLD 120) may transmit with one or more spatial streams up to the supported $N_{SS}$ declared by the non-AP MLD when enabling the EMLMR mode or at a time of association between the non-AP MLD and the AP MLD. Advantageously, this allows multiple MU PPDUs to be received simultaneously by STA1 and STA2 (e.g., in the primary 160-MHz channel or subband and in the secondary 160-MHz channel or subband) via multiple spatial streams as shown in FIG. 18.

Illustrative Implementations

Figure 19:
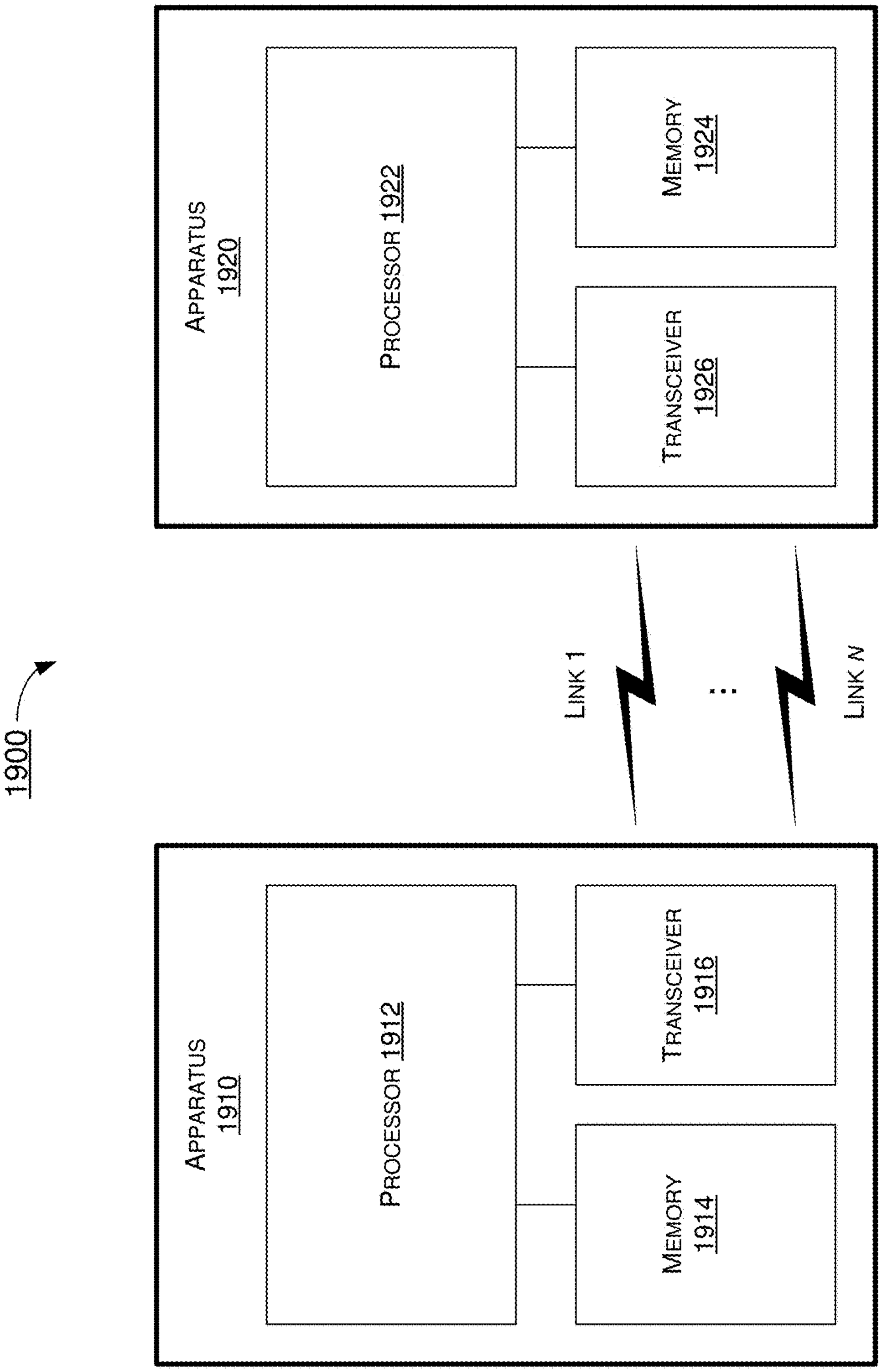
FIG. 19 is a block diagram of an example communication system in accordance with an implementation of the present disclosure.

FIG. 19 illustrates an example system 1900 having at least an example apparatus 1910 and an example apparatus 1920 in accordance with an implementation of the present disclosure. Each of apparatus 1910 and apparatus 1920 may perform various functions to implement schemes, techniques, processes and methods described herein pertaining to EMLSR and EMLMR subband operations in wireless communications, including the various schemes described above with respect to various proposed designs, concepts, schemes, systems and methods described above as well as processes described below. For instance, apparatus 1910 may be an example implementation of MLD 110, and apparatus 1920 may be an example implementation of MLD 120.

Each of apparatus 1910 and apparatus 1920 may be a part of an electronic apparatus such as, for example and without limitation, a portable or mobile apparatus, a wearable apparatus, a wireless communication apparatus or a computing apparatus. For instance, each of apparatus 1910 and apparatus 1920 may be implemented in a smartphone, a smart watch, a personal digital assistant, a digital camera, or a computing equipment such as a tablet computer, a laptop computer or a notebook computer. Each of apparatus 1910 and apparatus 1920 may also be a part of a machine type apparatus, which may be an IoT apparatus such as an immobile or a stationary apparatus, a home apparatus, a wire communication apparatus or a computing apparatus. For instance, each of apparatus 1910 and apparatus 1920 may be implemented in a smart thermostat, a smart fridge, a smart door lock, a wireless speaker or a home control center. When implemented in or as a network apparatus, apparatus 1910 and/or apparatus 1920 may be implemented in a network node, such as an AP in a WLAN.

In some implementations, each of apparatus 1910 and apparatus 1920 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Each of apparatus 1910 and apparatus 1920 may include at least some of those components shown in FIG. 19 such as a processor 1912 and a processor 1922, respectively, for example. Each of apparatus 1910 and apparatus 1920 may further include one or more other components not pertinent to the proposed scheme of the present disclosure (e.g., internal power supply, display device and/or user interface device), and, thus, such component(s) of apparatus 1910 and apparatus 1920 are neither shown in FIG. 19 nor described below in the interest of simplicity and brevity.

In one aspect, each of processor 1912 and processor 1922 may be implemented in the form of one or more single-core processors, one or more multi-core processors, one or more RISC processors or one or more CISC processors. That is, even though a singular term "a processor" is used herein to refer to processor 1912 and processor 1922, each of processor 1912 and processor 1922 may include multiple processors in some implementations and a single processor in other implementations in accordance with the present disclosure. In another aspect, each of processor 1912 and processor 1922 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 1912 and processor 1922 is a special-purpose machine specifically designed, arranged and configured to perform specific tasks including those pertaining to EMLSR and EMLMR subband operations in wireless communications in accordance with various implementations of the present disclosure.

In some implementations, apparatus 1910 may also include a transceiver 1916 coupled to processor 1912. Transceiver 1916 may be capable of wirelessly transmitting and receiving data. In some implementations, apparatus 1920 may also include a transceiver 1926 coupled to processor 1922. Transceiver 1926 may include a transceiver capable of wirelessly transmitting and receiving data. Transceiver 1916 of apparatus 1910 and transceiver 1926 of apparatus 1920 may communicate each other over one or more of multiple links link 1~link N, with N being a positive integer greater than 1, such as a first link and a second link.

In some implementations, apparatus 1910 may further include a memory 1914 coupled to processor 1912 and capable of being accessed by processor 1912 and storing data therein. In some implementations, apparatus 1920 may further include a memory 1924 coupled to processor 1922 and capable of being accessed by processor 1922 and storing data therein. Each of memory 1914 and memory 1924 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 1914 and memory 1924 may include a type of read-only memory (ROM) such as mask ROM, programmable ROM (PROM), erasable programmable ROM (EPROM) and/or electrically erasable programmable ROM (EEPROM). Alternatively, or additionally, each of memory 1914 and memory 1924 may include a type of non-volatile random-access memory (NVRAM) such as flash memory, solid-state memory, ferroelectric RAM (FeRAM), magnetoresistive RAM (MRAM) and/or phase-change memory.

Each of apparatus 1910 and apparatus 1920 may be a communication entity capable of communicating with each other using various proposed schemes in accordance with the present disclosure. For illustrative purposes and without limitation, a description of capabilities of apparatus 1910, as MLD 110 which may be a non-AP MLD, and apparatus 1920, as MLD 120 which may be an AP MLD, is provided below. It is noteworthy that, although the example implementations described below are provided in the context of WLAN, the same may be implemented in other types of networks.

Under a proposed scheme with respect to EMLSR and EMLMR subband operations in wireless communications in accordance with the present disclosure, processor 1912 of apparatus 1910, as a first MLD (e.g., MLD 110), may enable an EMLSR mode or an EMLMR mode (e.g., to cause MLD 110 to enter the EMLSR or EMLMR mode). Additionally, processor 1912 may receive, as a first STA affiliated with the first MLD and via transceiver 1916, from a second MLD (e.g., apparatus 1920) and in a first operating channel of the first STA an initial control frame indicating an allocated RU, which may be indicated in a Secondary RU Allocation subfield in the initial control frame. Moreover, processor 1912 may switch, as a second STA affiliated with the first MLD and via transceiver 1916, from a second operating channel of the second STA to an allocated channel in which the allocated RU is located. Furthermore, processor 1912 may receive, as the second STA and via transceiver 1916, information from the second MLD on the allocated RU during a TXOP.

In some implementations, in receiving the information, processor 1912 may receive a MU PPDU after expiry of a radio switching delay time of a subband operation.

In some implementations, the allocated channel may be different from the first operating channel of the first STA. Alternatively, the allocated channel may be the same as the first operating channel of the first STA.

In some implementations, the first operating channel of the first STA may include a first primary channel on a first link of a plurality of links. Additionally, the second operating channel of the second STA may include a second primary channel on a second link of a plurality of links different than the first link. In such cases, the allocated channel may include a first secondary channel on the first link.

In some implementations, the first operating channel of the first STA may include a first primary channel on a first link of a plurality of links. Moreover, the second operating channel of the second STA may include a first secondary channel on the first link.

In some implementations, the initial control frame may include a BSRP trigger frame.

In some implementations, the first operating channel may include a first 160-MHz subband on a first link of a plurality of links. Moreover, the second operating channel may include a second 160-MHz subband on the first link or a second link of the plurality of links.

In some implementations, processor 1912 may perform additionally operations. For instance, processor 1912 may receive, as the first STA and via transceiver 1916, a first data unit from the second MLD on the first operating channel during the TXOP. In such cases, in receiving the information as the second STA, process 2000 may involve processor 1912 receiving a second data unit from the second MLD on the allocated channel during the TXOP.

Under another proposed scheme with respect to EMLSR and EMLMR subband operations in wireless communications in accordance with the present disclosure, processor 1912 of apparatus 1910, as a first MLD (e.g., MLD 110), may enable an EMLSR mode or an EMLMR mode (e.g., to cause MLD 110 to enter the EMLSR or EMLMR mode). Additionally, processor 1912 may receive, as a first STA affiliated with the first MLD and via transceiver 1916, from a second MLD (e.g., apparatus 1920) and in a first operating channel of the first STA a first initial control frame indicating a first allocated RU, which may be located within the first operating channel and indicated in a Secondary RU Allocation subfield in a first User Info field in the first initial control frame. Also, processor 1912 may receive, as a second STA affiliated with the first MLD and via transceiver 1916, from the second MLD and in a second operating channel of the second STA a second initial control frame indicating a second allocated RU, which may be located within the second operating channel and indicated in another Secondary RU Allocation subfield in a second User Info field in the second initial control frame. Moreover, processor 1912 may communicate, as the first STA and via transceiver 1916, with the second MLD including receiving a first MU PPDU via the first allocated RU. Furthermore, processor 1912 may communicate, as the second STA and via transceiver 1916, with the second MLD including receiving a second MU PPDU via the first allocated RU.

In some implementations, the first operating channel may include a primary 160-MHz subband on a first link of a plurality of links. Moreover, the second operating channel may include a secondary 160-MHz subband on the first link.

In some implementations, in communicating, as the first STA and the second STA, with the second MLD, processor 1912 may receive the first MU PPDU and the second MU PPDU simultaneously via a plurality of spatial streams up to a supported number of spatial streams declared by the first MLD when the EMLMR mode is enabled or at a time of association between the first MLD and the second MLD.

Illustrative Processes

Figure 20:
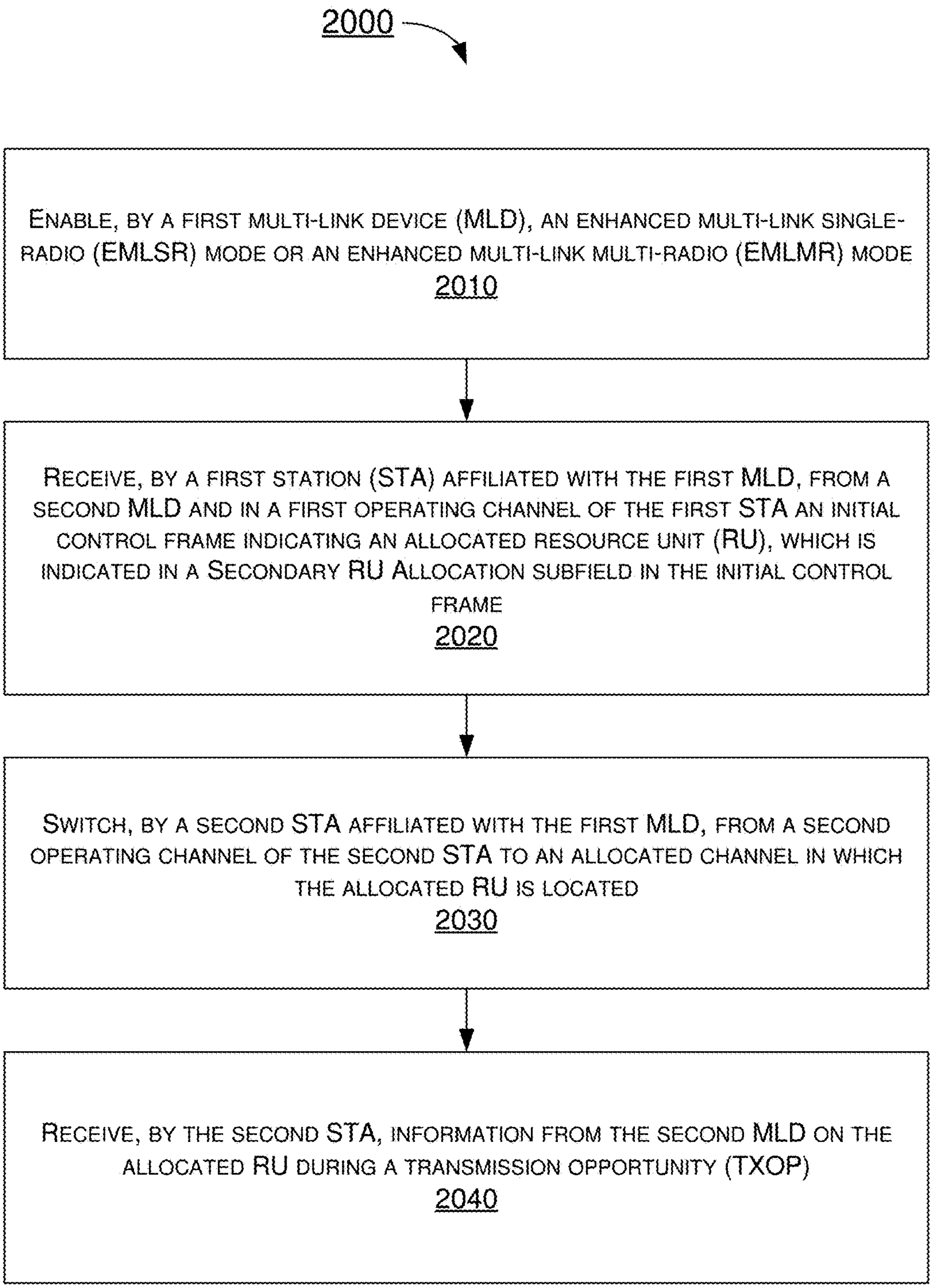
FIG. 20 is a flowchart of an example process in accordance with an implementation of the present disclosure.

FIG. 20 illustrates an example process 2000 in accordance with an implementation of the present disclosure. Process 2000 may represent an aspect of implementing various proposed designs, concepts, schemes, systems and methods described above. More specifically, process 2000 may represent an aspect of the proposed concepts and schemes pertaining to EMLSR and EMLMR subband operations in wireless communications in accordance with the present disclosure. Process 2000 may include one or more operations, actions, or functions as illustrated by one or more of blocks 2010, 2020, 2030 and 2040. Although illustrated as discrete blocks, various blocks of process 2000 may be divided into additional blocks, combined into fewer blocks, or eliminated, depending on the desired implementation. Moreover, the blocks/sub-blocks of process 2000 may be executed in the order shown in FIG. 20 or, alternatively in a different order. Furthermore, one or more of the blocks/sub-blocks of process 2000 may be executed repeatedly or iteratively. Process 2000 may be implemented by or in apparatus 1910 and apparatus 1920 as well as any variations thereof. Solely for illustrative purposes and without limiting the scope, process 2000 is described below in the context of apparatus 1910 as MLD 110 (e.g., a non-AP MLD) and apparatus 1920 as MLD 120 (e.g., a peer AP MLD) of a wireless network such as a WLAN in accordance with one or more of IEEE 802.11 standards. Process 2000 may begin at block 2010.

At 2010, process 2000 may involve processor 1912 of apparatus 1910, as a first MLD (e.g., MLD 110), enabling an EMLSR mode or an EMLMR mode (e.g., to cause MLD 110 to enter the EMLSR mode or EMLMR mode). Process 2000 may proceed from 2010 to 2020.

At 2020, process 2000 may involve processor 1912 receiving, as a first STA affiliated with the first MLD and via transceiver 1916, from a second MLD (e.g., apparatus 1920) and in a first operating channel of the first STA an initial control frame indicating an allocated RU, which may be indicated in a Secondary RU Allocation subfield in the initial control frame. Process 2000 may proceed from 2020 to 2030.

At 2030, process 2000 may involve processor 1912 switching, as a second STA affiliated with the first MLD and via transceiver 1916, from a second operating channel of the second STA to an allocated channel in which the allocated RU is located. Process 2000 may proceed from 2030 to 2040.

At 2040, process 2000 may involve processor 1912 receiving, as the second STA and via transceiver 1916, information from the second MLD on the allocated RU during a TXOP.

In some implementations, in receiving the information, process 2000 may involve processor 1912 receiving a MU PPDU after expiry of a radio switching delay time of a subband operation.

In some implementations, the allocated channel may be different from the first operating channel of the first STA. Alternatively, the allocated channel may be the same as the first operating channel of the first STA.

In some implementations, the first operating channel of the first STA may include a first primary channel on a first link of a plurality of links. Additionally, the second operating channel of the second STA may include a second primary channel on a second link of a plurality of links different than the first link. In such cases, the allocated channel may include a first secondary channel on the first link.

In some implementations, the first operating channel of the first STA may include a first primary channel on a first link of a plurality of links. Moreover, the second operating channel of the second STA may include a first secondary channel on the first link.

In some implementations, the initial control frame may include a BSRP trigger frame.

In some implementations, the first operating channel may include a first 160-MHz subband on a first link of a plurality of links. Moreover, the second operating channel may include a second 160-MHz subband on the first link or a second link of the plurality of links.

In some implementations, process 2000 may involve processor 1912 performing additionally operations. For instance, process 2000 may involve processor 1912 receiving, as the first STA and via transceiver 1916, a first data unit from the second MLD on the first operating channel during the TXOP. In such cases, in receiving the information as the second STA, process 2000 may involve processor 1912 receiving a second data unit from the second MLD on the allocated channel during the TXOP.

Figure 21:
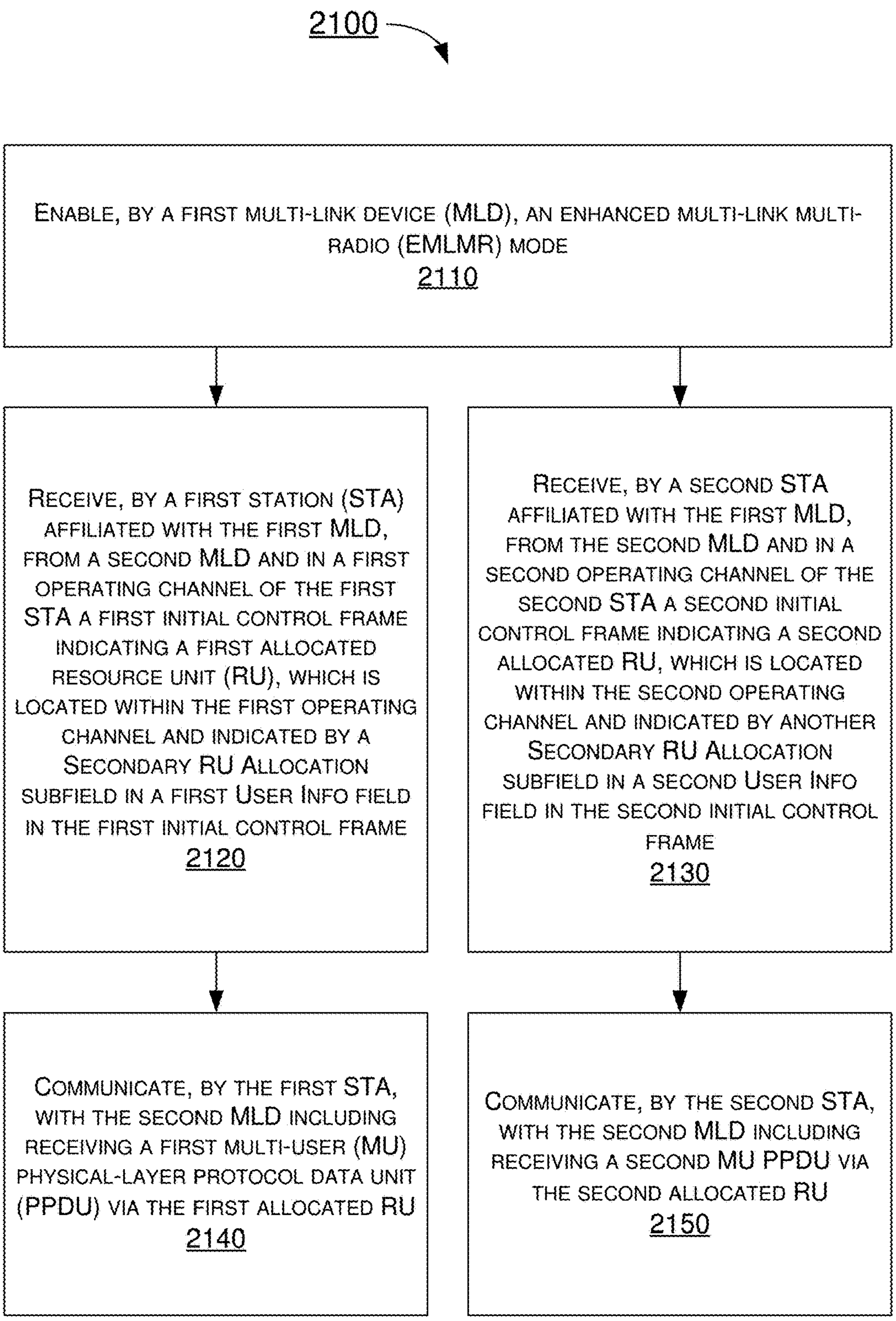
FIG. 21 is a flowchart of an example process in accordance with an implementation of the present disclosure.

FIG. 21 illustrates an example process 2100 in accordance with an implementation of the present disclosure. Process 2100 may represent an aspect of implementing various proposed designs, concepts, schemes, systems and methods described above. More specifically, process 2100 may represent an aspect of the proposed concepts and schemes pertaining to EMLSR and EMLMR subband operations in wireless communications in accordance with the present disclosure. Process 2100 may include one or more operations, actions, or functions as illustrated by one or more of blocks 2110, 2120, 2130, 2140 and 2150. Although illustrated as discrete blocks, various blocks of process 2100 may be divided into additional blocks, combined into fewer blocks, or eliminated, depending on the desired implementation. Moreover, the blocks/sub-blocks of process 2100 may be executed in the order shown in FIG. 21 or, alternatively in a different order. Furthermore, one or more of the blocks/sub-blocks of process 2100 may be executed repeatedly or iteratively. Process 2100 may be implemented by or in apparatus 1910 and apparatus 1920 as well as any variations thereof. Solely for illustrative purposes and without limiting the scope, process 2100 is described below in the context of apparatus 1910 as MLD 110 (e.g., a non-AP MLD) and apparatus 1920 as MLD 120 (e.g., a peer AP MLD) of a wireless network such as a WLAN in accordance with one or more of IEEE 802.11 standards. Process 2100 may begin at block 2110. It is noteworthy that, although operations of process 2100 may be described sequentially below, operations represented in 2120 and 2130 may be performed simultaneously; similarly, operations represented in 2140 and 2150 may be performed simultaneously.

At 2110, process 2100 may involve processor 1912 of apparatus 1910, as a first MLD (e.g., MLD 110), enabling an EMLMR mode (e.g., to cause MLD 110 to enter the EMLMR mode). Process 2100 may proceed from 2110 to 2120 and 2130.

At 2120, process 2100 may involve processor 1912 receiving, as a first STA affiliated with the first MLD and via transceiver 1916, from a second MLD (e.g., apparatus 1920) and in a first operating channel of the first STA a first initial control frame indicating a first allocated RU, which may be located within the first operating channel and indicated in a Secondary RU Allocation subfield in a first User Info field in the first initial control frame. Process 2100 may proceed from 2120 to 2140.

At 2130, process 2100 may involve processor 1912 receiving, as a second STA affiliated with the first MLD and via transceiver 1916, from the second MLD and in a second operating channel of the second STA a second initial control frame indicating a second allocated RU, which may be located within the second operating channel and indicated in another Secondary RU Allocation subfield in a second User Info field in the second initial control frame. Process 2100 may proceed from 2130 to 2150.

At 2140, process 2100 may involve processor 1912 communicating, as the first STA and via transceiver 1916, with the second MLD including receiving a first MU PPDU via the first allocated RU.

At 2150, process 2100 may involve processor 1912 communicating, as the second STA and via transceiver 1916, with the second MLD including receiving a second MU PPDU via the first allocated RU.

In some implementations, the first operating channel may include a primary 160-MHz subband on a first link of a plurality of links. Moreover, the second operating channel may include a secondary 160-MHz subband on the first link.

In some implementations, in communicating, as the first STA and the second STA, with the second MLD, process 2100 may involve processor 1912 receiving the first MU PPDU and the second MU PPDU simultaneously via a plurality of spatial streams up to a supported number of spatial streams declared by the first MLD when the EMLMR mode is enabled or at a time of association between the first MLD and the second MLD.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an"

limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds 'true' for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the 'true' scope and spirit being indicated by the following claims.

What is claimed is:

1. A method, comprising:

enabling, by a first multi-link device (MLD) which is a non-access point (non-AP) MLD, an enhanced multi-link operation mode;

receiving, by a first station (STA) affiliated with the first MLD, from a second MLD, which is an access point (AP) MLD and in a first operating channel of the first STA an initial control frame indicating an allocated resource unit (RU) allocated to a second STA affiliated with the first MLD;

responsive to receiving the initial control frame that indicates the allocated RU, switching, by the second STA, from a second operating channel of the second STA to an allocated channel in which the allocated RU is located, wherein the allocated RU is outside a current operating bandwidth of the second STA and is within an operating bandwidth of the second MLD and the first STA of the first MLD;

receiving, by the second STA, information from the second MLD on the allocated RU during a transmission opportunity (TXOP); and receiving, by the first MLD, a first physical-layer service data unit (PSDU) and a second PSDU that are destined to the first MLD with each of the first and second PSDUs encoded and decoded independently such that, during the TXOP:

the first STA receives the first PSDU in the first operating channel of the first STA on a first link of a plurality of links; and the second STA receives the second PSDU in the allocated channel on the first link.

2. The method of claim 1, wherein the receiving of the information comprises receiving a multi-user (MU) physical-layer protocol data unit (PPDU) after expiry of a radio switching delay time of a subband operation.

3. The method of claim 1, wherein the allocated channel is different from the first operating channel of the first STA.

4. The method of claim 1, wherein the allocated channel is the first operating channel of the first STA.

5. The method of claim 1, wherein the first operating channel of the first STA comprises a first primary channel on the first link of the plurality of links, and wherein the second operating channel of the second STA comprises a second primary channel on a second link of the plurality of links different than the first link.

6. The method of claim 5, wherein the allocated channel comprises a first secondary channel on the first link.

7. The method of claim 1, wherein the first operating channel of the first STA comprises a first primary channel on the first link of the plurality of links, and wherein the second operating channel of the second STA comprises a first secondary channel on the first link.

8. The method of claim 1, wherein the initial control frame comprises a buffer status report poll (BSRP) trigger frame.

9. The method of claim 1, wherein the first operating channel comprises a first 160-MHz subband on the first link of the plurality of links, and wherein the second operating channel comprises a second 160-MHz subband on the first link or a second link of the plurality of links.

10. An apparatus implementable in a first multi-link device (MLD) which is a non-access point (non-AP) MLD, comprising:

a transceiver configured to communicate wirelessly with a second MLD which is an access point (AP) MLD; and a processor coupled to the transceiver and configured to perform, via the transceiver, operations comprising:

enabling an enhanced multi-link operation mode;

receiving, as a first station (STA) affiliated with the first MLD, from the second MLD and in a first operating channel of the first STA an initial control frame indicating an allocated resource unit (RU) allocated to a second STA affiliated with the first MLD;

responsive to receiving the initial control frame that indicates the allocated RU, switching, as the second STA, from a second operating channel of the second STA to an allocated channel in which the allocated RU is located, wherein the allocated RU is outside a current operating bandwidth of the second STA and is within an operating bandwidth of the second MLD and the first STA of the first MLD;

receiving, as the second STA, information from the second MLD on the allocated RU during a transmission opportunity (TXOP); and receiving a first physical-layer service data unit (PSDU) and a second PSDU that are destined to the first MLD with each of the first and second PSDUs encoded and decoded independently such that, during the TXOP:

the first STA receives the first PSDU in the first operating channel of the first STA on a first link of a plurality of links; and the second STA receives the second PSDU in the allocated channel on the first link.

11. The apparatus of claim 10, wherein the receiving of the information comprises receiving a multi-user (MU) physical-layer protocol data unit (PPDU) after expiry of a radio switching delay time of a subband operation.

12. The apparatus of claim 10, wherein the first operating channel of the first STA comprises a first primary channel on the first link of the plurality of links, wherein the second operating channel of the second STA comprises a second primary channel on a second link of the plurality of links different than the first link, and wherein the allocated channel comprises a first secondary channel on the first link.

13. The apparatus of claim 10, wherein, responsive to the EMLMR mode being enabled, the processor is further configured to perform operations comprising:

receiving, as the first STA, from the second MLD and in the first operating channel of the first STA a first initial control frame indicating a first allocated RU;

receiving, as the second STA, from the second MLD and in the second operating channel of the second STA a second initial control frame indicating a second allocated RU;

communicating, as the first STA, with the second MLD including receiving a first multi-user (MU) physical-layer protocol data unit (PPDU) via the first allocated RU; and communicating, as the second STA, with the second MLD including receiving a second MU PPDU via the second allocated RU, wherein a Secondary RU Allocation subfield in a first User Info field in the first initial control frame indicates the first allocated RU which is located within the first operating channel, and wherein another Secondary RU Allocation subfield in a second User Info field in the second initial control frame indicates the second allocated RU which is located within the second operating channel.

14. The apparatus of claim 13, wherein the first operating channel comprises a primary 160-MHz subband on the first link of the plurality of links, and wherein the second operating channel comprises a secondary 160-MHz subband on the first link.

15. The apparatus of claim 13, wherein the communicating, as the first STA and the second STA, with the second MLD comprises receiving the first MU PPDU and the second MU PPDU simultaneously via a plurality of spatial streams up to a supported number of spatial streams declared by the first MLD when the EMLMR mode is enabled or at a time of association between the first MLD and the second MLD.

* * * * *